(12) United States Patent
Durham et al.

(10) Patent No.: US 9,990,249 B2
(45) Date of Patent: *Jun. 5, 2018

(54) MEMORY INTEGRITY WITH ERROR DETECTION AND CORRECTION

(71) Applicant: Intel Corporation, Santa Clara, CA (US)

(72) Inventors: David M Durham, Beaverton, OR (US); Siddhartha Chhabra, Hillsboro, OR (US); Sergej Deutsch, Hillsboro, OR (US); Men Long, Beaverton, OR (US); Alpa T Narendra Trivedi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/998,054

(22) Filed: Dec. 24, 2015

(65) Prior Publication Data

US 2017/0185532 A1    Jun. 29, 2017

(51) Int. Cl.
*H04L 9/08* (2006.01)
*H04L 9/30* (2006.01)
(Continued)

(52) U.S. Cl.
CPC ...... *G06F 11/1004* (2013.01); *G06F 12/0886* (2013.01); *G06F 12/1408* (2013.01);
(Continued)

(58) Field of Classification Search
CPC .... H04L 9/0858; H04L 9/304; G06F 12/1408
See application file for complete search history.

(56) References Cited

U.S. PATENT DOCUMENTS 5,696,823 A  *  12/1997  Blaze ................. G06Q 20/341
                                                   380/279
6,076,097 A  *   6/2000  London ................. G06F 7/588
                                                   380/46
(Continued)

FOREIGN PATENT DOCUMENTS

WO         03030441 A2      4/2003
WO       2008020279 A2      2/2008
WO       2013002789 A1      1/2013

OTHER PUBLICATIONS

Non-Final Office Action for U.S. Appl. No. 14/967,545, dated Dec. 27, 2016, 21 pages.
(Continued)

*Primary Examiner* — Jason C Chiang
(74) *Attorney, Agent, or Firm* — Jordan IP Law, LLC

(57) ABSTRACT

Apparatus, systems, and/or methods may provide for identifying unencrypted data including a plurality of bits, wherein the unencrypted data may be encrypted and stored in memory. In addition, a determination may be made as to whether the unencrypted data includes a random distribution of the plurality of bits, for example based on a compressibility function. An integrity action may be implemented when the unencrypted data includes a random distribution of the plurality of bits, which may include error correction including a modification to ciphertext of the unencrypted data. Independently of error correction, a diffuser may generate intermediate and final ciphertext. In addition, a key and/or a tweak may be derived for a location in the memory. Moreover, an integrity value may be generated (e.g., as a copy) from a portion of the unencrypted data, and/or stored in a slot of an integrity check line based on the location.

19 Claims, 8 Drawing Sheets

(51) Int. Cl.
  *G06F 12/14* (2006.01)
  *G06F 11/10* (2006.01)
  *G06F 12/0886* (2016.01)
  *G06F 21/00* (2013.01)
  *G06F 21/79* (2013.01)

(52) U.S. Cl.
  CPC ............. *G06F 21/00* (2013.01); *G06F 21/79* (2013.01); *H04L 9/0858* (2013.01); *H04L 9/304* (2013.01); *G06F 2212/401* (2013.01)

(56) References Cited

U.S. PATENT DOCUMENTS

| | | | | |
|---|---|---|---|---|
| 6,543,022 | B1* | 4/2003 | O'Connor | H03M 13/03 380/46 |
| 6,678,828 | B1* | 1/2004 | Pham | G06F 3/0622 726/2 |
| 7,508,945 | B1* | 3/2009 | Ferre Herrero | H04L 9/0656 380/268 |
| 7,774,681 | B2* | 8/2010 | Earhart | G11B 20/1217 714/755 |
| 9,213,653 | B2 | 12/2015 | Durham et al. | |
| 9,319,179 | B1* | 4/2016 | Ahirwar | H04L 1/0041 |
| 2005/0108555 | A1* | 5/2005 | Sibert | G06F 21/606 713/187 |
| 2006/0080553 | A1 | 4/2006 | Hall | |
| 2006/0090114 | A1* | 4/2006 | Duffy | G06K 9/00597 714/746 |
| 2008/0232581 | A1 | 9/2008 | Elbaz et al. | |
| 2008/0313525 | A1* | 12/2008 | Baker | G06F 11/1072 714/758 |
| 2009/0150745 | A1* | 6/2009 | Langner | H03M 13/11 714/752 |
| 2010/0146303 | A1 | 6/2010 | Kothari et al. | |
| 2010/0223524 | A1* | 9/2010 | Duggan | H03M 13/3707 714/751 |
| 2011/0246862 | A1* | 10/2011 | Graef | H03M 13/1108 714/785 |
| 2012/0297271 | A1* | 11/2012 | Sommer | G06F 11/1048 714/766 |
| 2015/0161059 | A1 | 6/2015 | Durham et al. | |
| 2015/0236717 | A1* | 8/2015 | El-Khamy | H03M 13/3905 714/807 |
| 2016/0112189 | A1* | 4/2016 | Tomaru | H04K 1/02 380/268 |
| 2017/0012970 | A1* | 1/2017 | Mandal | H04L 63/0884 |

OTHER PUBLICATIONS

Michael Henson et al., "Memory encryption: A survey of existing techniques", Computing Surveys (CSUR), Mar. 2014, pp. 1-26, vol. 46 Issue 4, ACM.

International Search Report and Written Opinion for International Application No. PCT/US2014/063986, dated Jul. 30, 2015, 14 pages.

Non-Final Office Action for U.S. Appl. No. 14/097,414, dated Apr. 17, 2015, 5 pages.

Notice of Allowance for U.S. Appl. No. 14/097,414, dated Aug. 7, 2015, 17 pages.

Notice of Allowance for U.S. Appl. No. 14/967,545, dated Jul. 14, 2017, 14 pages.

\* cited by examiner

MEMORY INTEGRITY WITH ERROR DETECTION AND CORRECTION

TECHNICAL FIELD

Embodiments generally relate to memory integrity. More particularly, embodiments relate to error detection, error correction, encryption, decryption, determination of whether data is random (or ordered), determination whether an integrity value is needed, generation and use of the integrity value, and/or generation and use of a key or a tweak to provide memory integrity.

BACKGROUND

Encryption of memory in a device, such as a personal computer, a smart mobile phone, etc., may be used to protect data stored in the memory when the device is operating, lost, stolen, etc. Encryption of the memory may, however, remain vulnerable since the data may be corrupted by an adversary via an initial and/or a repeated memory corruption attack. Moreover, data stored in the memory may become corrupt as a result of normal operation and/or the passage of time. Thus, a processor may execute corrupt data and cause an array of undesirable effects such as, for example, a password login attempt to erroneously succeed, fail, etc., an application to misbehave, crash, etc., the device to misbehave, crash, etc.

While being an in-line approach and having a relatively low storage cost, parity may be deterministic insofar as the adversary may successfully guess how to change bits of stored data to pass a check. Moreover, relatively large codes to verify the integrity of stored data may not be deterministic to the adversary but may include relatively high storage cost. Additionally, integrity actions may include reverting to a previous state prior to an error, which may be a burden on computational resources or may cause uncorrupted data to be lost. In addition, a wide array of attacks to data stored in the memory may not be detectable and/or correctable.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
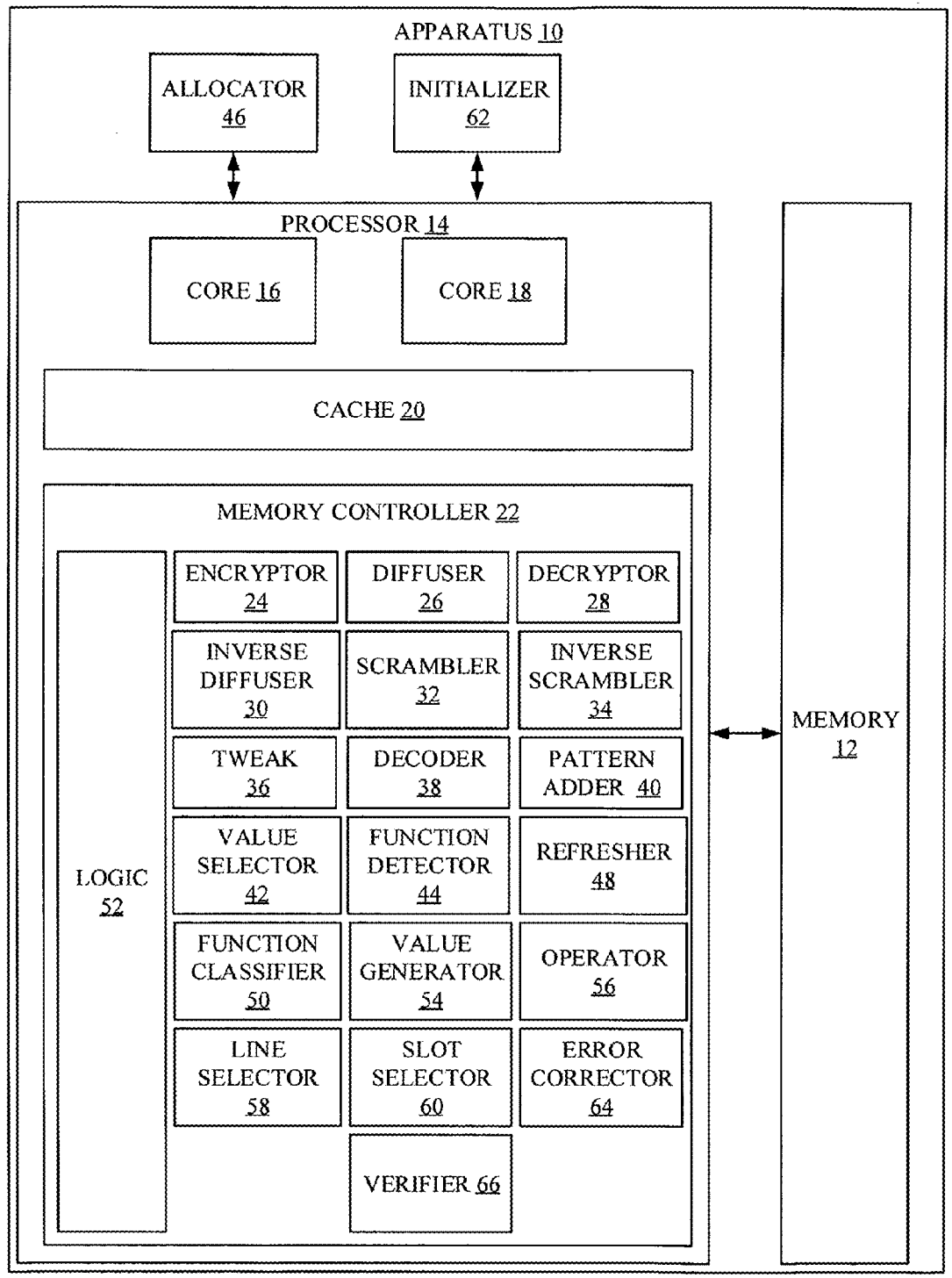
FIG. 1 is block diagram of an example of an apparatus to maintain memory integrity according to an embodiment.

Turning now to FIG. 1, an apparatus 10 is shown to provide memory integrity according to an embodiment. The apparatus 10 may include any computing device and/or data platform such as a laptop, personal digital assistant (PDA), media content player, imaging device, mobile Internet device (MID), any smart device such as a wireless smart phone, smart tablet, smart TV, computer server, and so on, or combinations thereof. In addition, the apparatus 10 may include any platform having computing functionality (e.g., personal digital assistant, laptop, smart tablet), communications functionality (e.g., wireless smart phone), imaging functionality, media playing functionality (e.g., smart TV), and so on, or combinations thereof (e.g., MID).

The illustrated apparatus 10 includes memory 12. The memory 12 may be external to a processor 14 (e.g., external memory), and/or may be coupled to the processor 14 by, for example, a memory bus. In addition, the memory 12 may be implemented as main memory. The memory 12 may include, for example, volatile memory, non-volatile memory, and so on, or combinations thereof. For example, the memory 12 may include dynamic random access memory (DRAM) configured as one or more memory modules such as, for example, dual inline memory modules (DIMMs), small outline DIMMs (SODIMMs), etc., read-only memory (ROM) (e.g., programmable read-only memory (PROM), erasable PROM (EPROM), electrically EPROM (EEPROM), etc.), phase change memory (PCM), and so on, or combinations thereof. The memory 12 may include an array of memory cells arranged in rows and columns, partitioned into independently addressable storage locations.

Thus, access to the memory 12 may involve using an address for a storage location such as, for example, a row address identifying the row containing the storage memory location and a column address identifying the column containing the storage memory location. In addition, a device internal to apparatus 10 and/or a device external to the apparatus 10 may accomplish access to the memory 12. In one example, access to the memory 12 may include an input/output (I/O) device, an accelerator, and so on. Access to the memory 12 may involve, for example, direct memory access (DMA).

The processor 14 may include any type of processor such as, for example, a micro-processor, an embedded processor, a digital signal processor (DSP), a central processing unit (CPU), a graphical processing unit (GPU), a visual processing unit (VPU), a network processor, a device to execute code to implement the technologies described herein, and so on, or combinations thereof. The processor 14 may include one or more cores such as, for example, a core 16 and a core 18. The cores 16, 18 may include a single-threaded core, a multithreaded core including more than one hardware thread context (or "logical processor") per core, and so on, or combinations thereof. The cores 16, 18 may include an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

For example, the cores 16, 18 may execute one or more instructions such as a read instruction, a write instruction, an erase instruction, a move instruction, an arithmetic instruction, a control instruction, and so on, or combinations thereof. The cores 16, 18 may, for example, execute one or more instructions to move data (e.g., program data, operation code, operand, etc.) between a register (not shown) and the memory 12, to read the data from the memory 12, to write the data to the memory 12, to perform an arithmetic operation using the data (e.g., add, subtract, bitwise operation, compare, etc.), to perform a control operation associated with the data (e.g., branch, etc.), and so on, or combinations thereof. The instructions may include any code representation such as, for example, binary code, octal code, and/or hexadecimal code (e.g., machine language), symbolic code (e.g., assembly language), decimal code, alphanumeric code, higher-level programming language code, and so on, or combinations thereof. Thus, for example, hexadecimal code may be used to represent an operation code (e.g., opcode) of an x86 instruction set including a byte value "00" for an add operation, a byte value "8B" for a move operation, a byte value "FF" for an increment/decrement operation, and so on.

The processor 14 may include internal storage such as, for example, a processor cache including one or more levels. The processor cache may not be encrypted and/or may share a same die as the processor 14, on the same chip. In addition, the processor cache may be integrated onto one or more of the cores 16, 18. The illustrated processor 14 includes a cache 20, which may store data (e.g., instructions, operands, program data, etc.) utilized by one or more components of the processor 14. The cache 20 may include any type of cache such as, for example, an instruction cache, a data cache, a single level cache, a multilevel cache, a shared cache, a strictly inclusive cache, an exclusive cache, and so on, or combinations thereof. For example, the cache 20 may include a mid-level cache, such as level 2 (L2), level 3 (L3), level 4 (L4), or other levels of cache, a last level cache (LLC), and so on, or combinations thereof. The cores 16, 18 may check whether data is located in the cache 20 to execute one or more instructions and/or other data (e.g., program data, etc.), wherein a cache miss may cause a transfer of the data from the memory 12 to the cache 20 in a block of fixed size (e.g., cache line).

The illustrated processor 14 also includes a memory controller 22, which may couple the processor 14 with the memory 12, manage the flow of data to and/or from the memory 12, and so on, or combinations thereof. While the memory controller 22 is illustrated as integrated onto the processor 14, the memory controller 22 may be discrete logic outside the processor 14 rather than integrated therein. Similarly, components illustrated as integrated onto the memory controller 22 may be discrete logic outside the memory controller 22 rather than integrated therein.

Each core 16, 18 may be, for example, coupled with respective memory via a respective memory controller, coupled with shared memory via a shared memory controller, coupled with respective memory via a shared memory controller, and so on, or combinations thereof. In addition, a shared cache may be coupled with a shared memory controller, a plurality of caches may be coupled with a plurality of respective memory controllers, and so on, and combinations thereof. For example, the memory controller 22 may be shared among the cores 16, 18, may be coupled with the cache 20 (e.g., shared multilevel cache), and may couple the cores 16, 18 with the memory 12 (e.g., shared DRAM). The memory controller 22 may be coupled with the memory 12 (e.g., external memory, DRAM, etc.), for example, via a memory bus.

The illustrated memory controller 22 includes an encryptor 24, which may encrypt unencrypted data. The unencrypted data may include, for example, cleartext data, plaintext data, and so on, or combinations thereof. The cleartext data may be subject to encoding in a special format (e.g., hypertext transfer markup language (HTML), rich text format (RTF), etc.) and read by an appropriate program (e.g., word processor, text editor, etc.) without the need for decryption. The plaintext data may include pre-encryption data such as, for example, cleartext data which is to be encrypted prior to transmission and/or storage. In addition, the plaintext data may include post-decryption data such as, for example, data which is the result of decryption on received and/or retrieved data.

Additionally, the plaintext data may include data which is encodable in any format, such as audio/video data (e.g., moving picture experts group (MPEG) data, etc.), image data (e.g., joint photographic experts group (JPEG) data, etc.), financial data (e.g., automatic transfer machine (ATM) transaction data, etc.) and so on, or combinations thereof. The plaintext data may include program data such as, for example, at least a part of a program, an operating system (OS), an application, a virtual machine (e.g., Virtual Machine Monitor (VMM) code, etc.), and so on, or combinations thereof. The plaintext data may also include, for example, an instruction including an opcode, an operand, and so on, or combinations thereof. The plaintext data may also be compressible data (e.g., may be compressed). In addition, the plaintext data may be any data that is input to an encryption operation. In this regard, the plaintext data may be ciphertext data that is encrypted by, e.g., a software program and that passes through the encryptor 24 to be encrypted again (e.g., via a different key and/or a different encryption operation) when evicted out of core caches.

The unencrypted data may include a plurality of bits. The plurality of bits may include one or more bits (e.g., a byte, etc.) in any code representation, such as binary code, octal code, hexadecimal code, symbolic code, decimal code, alphanumeric code, higher-level programming language code, and so on, or combinations thereof. For example, a memory reference instruction may include a byte for an opcode, bits for an address, and so on, wherein the bits of the memory reference instruction may be represented in hexadecimal code (e.g. machine language), in symbolic code (e.g., assembly language), and so on, or combinations thereof. Additionally, the plurality of bits may be translated to and/or from binary code, wherein the binary code may be executed by the cores 16, 18, may be sorted at the memory 12, may be fetched from the memory 12, and so on, or combinations thereof.

The encryptor 24 may include any type of cipher to generate cyphertext such as, for example, a block cipher in any desired mode of operation to generate ciphertext (e.g., unreadable output from an encryption process) from unencrypted data. In this regard, the unencrypted data may be data that is not yet at all encrypted (e.g., cleartext). In addition, the unencrypted data may be data that is not yet encrypted by the encryptor 24 (e.g., as data that is input to an encryption process), even though the data may be encrypted prior to reaching the encryptor 24 via, for example, using a different key than used by the encryptor 24, a different encryptor than the encryptor 24 (e.g., a software program), and so on. In either case, the block cipher may include a fixed block size, wherein the block cipher may be repeatedly implemented to encrypt data larger than the block size. For example, the block cipher may include advanced encryption standard (AES) in a propagating cipher-block chaining (PCBC) mode of operation, in an electronic code book (ECB) mode of operation, and so on, or combinations thereof.

In addition, the block cipher may include an expandable block size. In one example, the block cipher is Threefish, which may be implemented to obtain an expandable block size of any length (e.g., 256 bits, 512 bits, 1024 bits, etc.). For example, Threefish may utilize a tweak (e.g., 128 bits), which may include a memory address and/or location, and a key which may be the same width as the block, may utilize a number of rounds (e.g., 72) to encrypt for blocks of 256 bits and 1024 bits, a number of rounds (e.g., 80) for blocks of 1024 bits, and so on. Threefish may utilize a function MIX including an addition operation, a rotation operation by a constant, and an exclusive-or (XOR) operation. Words may be permutated, for example, after each set of MIX functions (e.g., 2, 4, or 8, respectively by block size). A subkey may be injected into the system, for example, every number of rounds (e.g., 4) wherein the subkey may be generated by parts of the key, the tweak, and a counter value. The key and the tweak may be given an extra word at the end (e.g., an XOR of all the other words).

Accordingly, a block cipher may be selected including a block size sufficient to maximize the diffusion such as, for example, a 128-bit cipher when the cache line is 128-bits. In addition, an expandable block cipher (e.g., Threefish) may be selected and/or implemented, and the block size of the expandable block cipher may be set equal to the granularity at which the memory 12 is to be accessed to maximize the diffusion. For example, the block size may be set to be as large as the entire data line. The block size may be set to any particular number of bytes when the amount of memory to be fetched from the memory 12 is the particular number of bytes. Thus, the block cipher may be scaled to the atomic unit at which the cores 16, 18 read data from the memory 12, write data to the memory 12, and so on, or combinations thereof.

Moreover, the illustrated memory controller 22 includes a diffuser 26 which may be implemented to maximize diffusion. For example, the diffuser 26 may be implemented to encrypt when a block size of a block cipher is less than a granularity at which the memory 12 is to be accessed. The diffuser 26 may include any block cipher in any mode of operation. The diffuser 26 may include, for example, cascading block cipher, PCBC, ECB, etc., forward and backward, to insure that at least a single bit change (e.g., one-bit change, two-bit change, all-bit change, etc.), regardless of location, influences the bits of a fetched data line regardless of size.

Thus, in addition to matching a cipher's block size to the data line size described above, AES-PCBC, AES-ECB, etc., may be implemented when a cipher is not wide enough to cover the full cache line width. AES-PCBC, AES-ECS, etc., may run multiple times bi-directionally along the cache line (e.g., encrypt front to back, and then re-encrypt the cache line back to front) to ensure substantial diffusion across unencrypted data using cipher block chaining. In one example shown in FIG. 2A, discussed below, intermediate ciphertext may be generated for each data block of unencrypted data using a number of encryption rounds that ensures diffusion across the unencrypted data of at least a one-bit change (e.g., 2 rounds of AES) and that is less than a number that provides sufficient confidentiality (e.g., 10 rounds of AES). In another example as shown in FIG. 2B, discussed below, intermediate ciphertext may be generated for each data block of unencrypted data using a re-mapping of bits of each data block.

Accordingly, in any or all of the examples discussed herein, unencrypted data (e.g., plaintext) may be implemented as input to the encryptor 24 and/or the diffuser 26 to generate an unreadable copy of the unencrypted data (e.g., ciphertext) when the unencrypted data is to be stored in or read from the memory 12 (e.g., write, read, etc.).

The illustrated memory controller 22 further includes a decryptor 28, which may decrypt ciphertext data to generate unencrypted data. The decryptor 28 may include an inverse of the encryptor 24. For example, the decryptor 28 may include an inverse of Threefish. In this case, the subkeys may be applied in reverse order, with each round including the reverse word permutation followed by the reverse MIX functions. The illustrated memory controller 22 also includes an inverse diffuser 30 to maximize diffusion. The inverse diffuser 30 may include the inverse of the diffuser 26, which may be implemented to decrypt the ciphertext data in a reverse manner relative to the encryption used. FIGS. 2C-2D, discussed below, show examples of inverse diffusers.

Accordingly, in any of the examples discussed herein, ciphertext may be decrypted to generate unencrypted data when the ciphertext is to be fetched from the memory 12 (e.g., read operation). Moreover, encryption and decryption may be implemented over an atomic unit to maximize a random distribution of a plurality of bits, wherein at least a one-bit change may cause a random bit difference at approximately half the total number of bits, and wherein the distribution of the changed bits may be diffused across substantially an entire data line when the cipher block size is as large as the data line. The distribution may follow, e.g., a binomial IID random distribution bit sequence.

The illustrated memory controller 22 further includes an address scrambler 32 to scramble a physical memory address utilized to access the memory 12, and an inverse address scrambler 34 to reverse the scramble of the physical memory address. The scrambler 32 may map sequential input logical addresses into non-sequential physical addresses, wherein memory access that may logically correspond to a row or column of the memory 12 may be scattered among multiple rows and columns of the memory 12. The scrambler 32 may, for example, generate a random number per power-up of a computing platform, which may be XORed with the physical address. The inverse address scrambler 34 may include the inverse of the address scrambler 32, which may be implemented to descramble in a reverse manner relative to the scramble used. Thus, an adversary may not gain information about the unencrypted data otherwise available by distributing the encrypted data over random locations in the memory 12.

The illustrated memory controller 22 further includes a tweak function 36 to utilize a physical memory address (e.g., scrambled, unscrambled, etc.) as a tweak to a block cipher to bind unencrypted data with the physical memory address. The tweak function 36 may include, for example, XTS algorithm, LRW algorithm, and so on, or combinations thereof. The tweak function 36 may, for example, spread the original physical memory address, XOR the address with the unencrypted data, and run the result through the encryptor 24 with a key to bind the unencrypted data to the address. In one example when an attack includes swapping ciphertext data to a different memory location, the decryptor 28 may decrypt the ciphertext data with a memory address corresponding to a different memory location, causing corresponding unencrypted data (e.g., plaintext data) to include a random distribution of the plurality of bits.

The illustrated memory controller further includes a decoder 38 to decode the unencrypted data and recognize one or more instructions. For example, uncorrupted unencrypted data (e.g., valid plaintext) may contain opcodes when substantially an entire data line (e.g., a 64-byte cache line) is fetched from the memory 12 and is decrypted. Thus, the decoder 38 may recognize an opcode of an instruction set such as, for example, an x86 instruction set, etc., when the decoder 38 decodes the plaintext data.

The illustrated memory controller 22 further includes a pattern adder 40 to add a recognizable non-random pattern to unencrypted data before the unencrypted data is encrypted. The pattern may be added, for example, to minimize a random distribution of a plurality of bits. For example, the pattern adder 40 may generate and/or add a non-random pattern to the unencrypted data, which may be used as plaintext data input to the encryptor 24. The pattern adder 40 may add n-bits of integrity (e.g., greater than or equal to 32 bits, etc.) to an end of the unencrypted data, an intermediate portion of the unencrypted data, and so on, or combinations thereof. The added pattern may include, for example, an all zero pattern, an all ones pattern, an alternating bit pattern of zeros and ones, and so on, or combinations thereof. In a majority of real data situations, patterns naturally occur in a data line and, therefore, the recognizable non-random pattern may not be readily utilized. As discussed below, the pattern adder 40 may be used more readily to add a pattern to an integrity check line to be used during error correction.

The illustrated memory controller 22 further includes a value selector 42 to select a key from a plurality of keys (e.g., a key domain) and/or a tweak from a plurality of tweaks (e.g., a tweak domain) for a physical location in the memory 12. For example, the illustrated memory controller 22 includes a function detector 44 to determine that a function (e.g., a program, middleware, an operating system, firmware, virtual machine, VMM, OS kernel, etc.) or a part of the function (e.g., part of a program, etc.) is being launched for the first time, or is being given access to a physical location in the memory 12 for the first time. The value selector 42 may, in response, select a key and/or a tweak (e.g., a key from a key domain, a different key from a same key domain, a different key from a different key domain, a tweak from a tweak domain, a different tweak from a same tweak domain, a different tweak from a different tweak domain, etc.) for the physical location in the memory when the function (and/or part thereof) is given access.

The value selector 42 may select a key based on a value determined from a bit of a physical memory address for a data line, such as an unused address bit. A key domain for a specific physical memory location may be defined by a number of unused address bits to be selected to determine the value. For example, a particular physical memory location may belong to a particular key domain at one time, wherein the unused address bits may be used to define the key domain (e.g., a key domain including 16 keys for a single physical memory location where four unused address bits are utilized). Thus, the physical memory location may use different keys at different points in time based on a domain that the location maps to. The value selector 42 may derive the key by, for example, encrypting the value (e.g., 0001, 0010, etc.) using a secret master key that may be protected (e.g., in a trusted execution environment) by the apparatus 10. In addition, the value selector 42 may derive the key by, for example, retrieving the key from an array of protected keys using the value as a pointer to the array.

Moreover, the value selector 42 may select a tweak by setting a bit of the physical memory address that is to be used as a tweak by the tweak function 36. In this regard, a tweak for XTS mode will include the unused address bits and the used address bits of a physical memory address. Thus, different ciphertext will result from different addresses used for the tweak (even if actually referring to the same location) when the unused address bits are selected/changed by the value selector 42.

The illustrated apparatus 10 further includes an allocator 46 to allocate a physical location in the memory 12 to a function (and/or part thereof) that frees the physical location after use and reallocates the physical location to another function (and/or part thereof). The allocator 46 may include a program executing on the cores 16, 18. In one example, the allocator 46 may be a library to implement functions such as alloc, malloc, new, free, delete, and so on. In another example, the allocator 46 may be heap manager, a stack allocator, and so on. In either case, the functionality of the allocator 46 and the value selector 42 (e.g., a software key/tweak selector) may be combined. For example, the allocator 46 may select which address (including unused address bits) is used to reference a memory location and, therefore, naturally select a key or a tweak that corresponds to the unused address bits which is chosen. Thus, a key (e.g., a different key from a key domain, etc.) and/or a tweak (e.g., a different address for a same physical memory location) may be selected for the physical location when the physical location is free.

Moreover, a virtual memory address may be mapped to a physical memory address using paging structures (e.g. page tables). Accordingly, software may define a virtual memory address that maps to a physical memory address including unused physical address bits. A different virtual memory address may likewise map to a different physical memory address where the unused address bits are different, but the physical memory location (as determined by the used address bits) is the same. In this regard, the virtual addresses effectively alias to the same physical memory location, but will generate different ciphertext because the address values are different when considering the unused address bits. Thus, the value selector 42 may be combined with any other addressing functionality to provide key or tweak capabilities.

The illustrated memory controller 22 further includes a refresher 48 to refresh a part or all of the memory 12 to minimize errors that naturally occur during the passage of time. The refresh may occur periodically, at any predetermined time interval, and the value selector 42 may, in response, select a key (e.g., a different key from a key domain, etc.) or a tweak for the physical location when the physical location is refreshed.

The illustrated memory controller 22 further includes a function classifier 50 to classify a function being assigned a physical location in the memory 12. For example, the function classifier 50 may identify a function type (e.g., a paging kernel within an OS kernel, a VMM, etc.), a function privilege (e.g., a privilege level, etc.), a function section (e.g., a critical code section, etc.), and so on. The value selector 42 may, in response, select a key (e.g., a key corresponding to critical code, a key domain corresponding to critical code, etc.) and/or a tweak (e.g., a tweak corresponding to critical code, etc.) for the physical location to be used by the function section when the function (and/or part thereof) is assigned. Thus, in one example, software domains may be separated using separate key domains.

Notably, using different keys and/or tweaks (e.g., derived by encrypting changing values of unused address bits, by using different physical addresses in XTS mode from changing values of unused address bits, etc.) results in different ciphertext for the same physical memory location at different points in time and provides a time dimension to the memory 12 that allows for memory corruption previously undetectable or uncorrectable to be detected or corrected. For example, replay protection may be provided to prevent a replay of previously stored data encrypted with an obsolete key and/or tweak that occupied a physical memory address. The previously stored data encrypted with the obsolete key and/or tweak will not be replayed since the previously stored data will not decrypt properly with a present key and/or tweak for the same physical memory address, and/or since a mismatch may occur involving an integrity value (e.g., a mismatch between decrypted data and a copy of valid plaintext).

In addition, use-after-free protection previously not possible may be provided to prevent an obsolete/freed memory address/pointer to be used to access or corrupt newly allocated/reallocated memory. For example, an obsolete pointer (dangling pointer) that is freed by a previous function (e.g., a previous program that accesses memory with the obsolete pointer) and remains discoverable or known to the previous function cannot later be used by the previous function to access or corrupt newly allocated/assigned physical location in the memory 12 that is associated with a present key (e.g., a different key than that of the dangling pointer) and/or tweak being used by a present function to access the memory 12. Similar to replay protection, an integrity check will fail either by improper decryption or mismatch involving an integrity value.

For example, when a software memory allocator (e.g. malloc) re-allocates a physical memory location that was previously freed, it will select an address that maps to a different value of the unused bits of the physical address bits. That is, it will use a different address that still aliases to the same physical memory location as the previous address. The fact that the physical memory address is different (even though it is in reference to the unused address bits) signifies that, for example, a tweak value is different and, thus, the ciphertext is different.

Additionally, using different keys and/or tweaks for different locations in the memory 12 provides a spatial dimension to the memory 12, which may allow for memory corruption previously inefficiently detectable or correctable to be efficiently detected or corrected. For example, allocating adjacent data blocks in the memory 12 with different keys and/or tweaks may provide buffer overflow/underflow protection (e.g., protection against a stack overflow, a heap overflow, an exploit that violates intended bounds of a data structure, etc.). In one example, a function (e.g., a program, etc.) that increments past an intended memory space (e.g., a data line) into adjacent memory space will trigger an integrity failure when the adjacent memory space is associated with a different key and/or tweak that is unknown to the function. Similar to replay protection and use-after-free protection, an integrity check will fail either by improper decryption or mismatch involving an integrity value.

For example, unused address bits may be used to distinguish between adjacent memory allocations. When a buffer (e.g., A) is allocated at a physical address (e.g., 0x00000000001) and a buffer (e.g., B) is allocated at a different physical address (e.g., 0x00000000002), the upper unused address bit for buffer B may be changed (e.g., 0x10000000002). Since the upper address bits are used, the two memory locations are still adjacent but, for example, a tweak for XTS derived from the full address value will be different for the two buffers A,B. Thus, incrementing the memory location 0x00000000001 will result in the wrong tweak when accessing the adjacent memory location 0x00000000002, which needs to be correctly accessed using the address 0x10000000002.

Accordingly, implicit bounds for the memory 12 may be created using different keys and/or tweaks. Moreover, the memory 12 may be changed in time and in space using different keys and/or tweaks. In addition, allowing the value selector 42 (e.g., a software value selector) to choose when to encrypt specific memory with a particular key and/or tweak may provide a deterministic approach to memory integrity (e.g., relative to conventional tweak approaches).

The illustrated memory controller 22 further includes logic 52, which may utilize components of the processor 14 such as, e.g., the encryptor 24, the decryptor 28, etc., to maintain (e.g., ensure, verify, test, protect, correct, etc.) integrity of the memory 12. The logic 52 may identify unencrypted data (e.g., pre-encryption data, post-decryption data, etc.) including a plurality of bits, which may be involved in a memory transaction such as, for example, unencrypted data involved in a read operation from the memory 12 (e.g., post-decryption data), unencrypted data involved in a write operation to the memory 12 (e.g., pre-encryption data), and so on, or combinations thereof.

The logic 52 may make a determination whether the unencrypted data includes a random distribution of the plurality of bits. For example, the logic 52 may determine whether the plurality of bits includes a pattern, a random distribution, and so on, or combinations thereof. The logic 52 may make the determination using any calculated and/or retrieved information. The information may correspond to, for example, the type of data (e.g., instructions, program data, etc.).

The logic 52 may make a determination whether the unencrypted data includes a random distribution of the plurality of bits at any time. For example, the logic 52 may make the determination before data is encrypted (e.g., pre-encryption data) and/or after a fetch of the data from the memory 12 and after the decryptor 28 decrypts the data to generate the unencrypted data (e.g., post-decryption data). The fetch may be in response to, for example, a cache miss. In one example, pre-encryption determination logic (e.g., algorithm, hardware logic, circuit logic, etc.) may be the same as post-decryption corruption detection logic (algorithm, hardware logic, logic, etc.) to ensure that each memory operation direction such as, for example, memory read, memory write, etc., may produce the same determination (e.g., whether or not patterns are present) for the same plaintext data.

Notably, if plaintext data (e.g., pre-encryption data) is a data block of all zeros that is encrypted to form ciphertext (e.g., post-encryption data), a change to the ciphertext may cause approximately fifty percent of the bits to change to ones (e.g., upon decryption), on average, wherein the bits of the corresponding plaintext data may appear in a random distribution (e.g., random bit flips across substantially the entire data block). The ciphertext may be changed, for example, by flipping one or more bits, inserting a bit, deleting a bit, exchanging a bit, modifying the post-encryption data, and so on, or combinations thereof, and the logic 52 may determine that the corresponding plaintext data (e.g., post-decryption data) includes a bit difference at approximately half the total number of bits of the data block. Thus, the encryptor 24 may encrypt a 64-byte data line of program data into a single data block of ciphertext, wherein a change to one or more of the resulting 512 bits of the ciphertext may cause a bit difference at approximately 256 positions out of the 512 bits in the corresponding plaintext, which may be diffused over the substantially the entire decrypted plaintext data block.

The logic 52 may, therefore, examine program data over an amount of memory (e.g., gigabytes of memory) to determine typical patterns appearing at a particular frequency, including relatively common patterns, relatively obscure patterns, and so on, or combinations thereof. In addition, the logic 52 may retrieve information regarding typical patterns from storage such as, for example, memory, a server, etc., from a data structure such as, for example, a table, etc., and so on, or combinations thereof. In one example, program data which is typically stored in the memory 12, fetched, and then decrypted may include more zero (0) bits than one (1) bits. Thus, the logic 52 may identify that more zero (0) bits than one (1) bits are typically encountered in a cache line for program data, and use the pattern to determine whether the unencrypted data includes a random distribution of the plurality of bits.

In addition, a Boolean true-false test (e.g., 32 bits) may be encountered for authentication operations such as, for example, using a password to log into a computing platform. The logic 52 may determine that the plurality of bits includes a pattern by identifying that a sequence of bits includes a first bit set to one (1), a second bit set to zero (0), and the remaining thirty bits set to zero (0) for a typical thirty-two bit true-false test. Additionally, the logic 52 may determine that the plurality of bits includes a pattern by identifying related patterns that may have a tendency to share the same cache line (e.g., based on the type of data). For example, the logic 52 may identify that instruction data such as, for example, x86 instructions may tend to share a cache line with other instruction data (e.g., x86 instructions, etc.), that program data may tend to share a cache line with other program data, that instruction data may tend to be located at a separate cache line relative to program data, and so on, or combinations thereof. The logic 52 may also identify that a sequence of bits for a type of data may tend to appear together. For example, HTML bit sequences (e.g., HTML patterns) may tend to appear together, ASCII bit sequences (e.g., ASCII patterns) may tend to appear together, MPEG bit sequences (e.g., MPEG patterns) and tend to appear together, and so on.

In addition, the logic 52 may retrieve an instruction set such as, for example, an x86 instruction set from the memory 12 and use corresponding values (e.g., byte values) to determine whether the unencrypted data includes a random distribution of the plurality of bits. Thus, the memory controller 22 may verify whether an unencrypted data line includes a valid stream of instructions such as, for example, a valid stream of x86 instructions, opcodes, etc., to make the determination. For example, the logic 52 may determine whether the plurality of bits includes a pattern by identifying instructions in the unencrypted data for basic operations, such as move, add, and so on.

While the logic 52 may match patterns for an entire instruction set, the logic 28 may seek at least a part of the instruction set such as, for example, byte values "00", "FF", and/or "8B" for an x86 instruction set, which may appear frequently and/or repeatedly within a cache line of a corresponding structure (e.g., x86 structure). Moreover, the decoder 38 may be disposed between the decryptor 28 and the logic 52 to indicate a presence of instructions in the unencrypted data, wherein the logic 52 may utilize the input from the decoder 38 to determine whether the unencrypted data is uncorrupted, does not include a random distribution of the plurality of bits, and so on, or combinations thereof.

The logic 52 may, for example, make the determination of whether the unencrypted data is uncorrupted by identifying a sequence of bits appearing in the unencrypted data at a frequency. The logic 52 may also count a number of instances the sequence of bits appears in the unencrypted data. Additionally, the logic 52 may determine that the unencrypted data does not include a random distribution of the plurality of bits when the number of instances satisfies the threshold value. For example, the logic 52 may apply the following example heuristic rule for a fetch of a cache line such as, for example, a fetch of a 64-byte cache line involving "$B_0B_1B_2 \ldots B_{63}$" from DRAM to the memory controller 22, wherein "$B_0B_1B_2 \ldots B_{63}$" may correspond to program code or text section:

```
count = 0
For j in 0 = 63 {
    If B_j = = "00" or B_j = = "FF" or B_j = = "8B"
    count ++
}
If count >= 9//seems like proper x86 computer program instructions
    Data integrity is good; pass data to processor
```

The logic 52 may determine whether the plurality of bits includes a pattern by identifying typical values of an instruction set (e.g., byte values "00", "FF", and/or "8B" in x86). In the example, the logic 52 may determine that the unencrypted data includes an uncorrupted (e.g., proper, valid, etc.) non-random instruction when the count is greater than or equal to a threshold value of 9. Thus, the memory controller 22 may verify whether an unencrypted cache line includes a valid stream of instructions such as, for example, a valid stream of x86 instructions, operation codes, etc., to make the determination.

The logic 52 may, therefore, determine that unencrypted data does not include a random distribution of the plurality of bits when the unencrypted data includes one or more typical bit sequences (e.g., a pattern) satisfying a threshold value. Conversely, the logic 52 may determine that unencrypted data includes a random distribution of a plurality of bits when the unencrypted data does not include one or more typical bit sequences satisfying the threshold value. Thus, the logic 52 may determine that the unencrypted data is corrupt (e.g., improper, invalid, etc.) when the threshold value is not satisfied. The threshold value may be, for example, predetermined and/or set to any value. In addition, the threshold value may be set for a particular type of pattern, may be set for a combination of patterns, and so on, or combinations therefor. Additionally, the patterns may be weighed, for example, to account for relatively common patterns, relatively obscure patterns, and so on, or combinations thereof.

The logic 52 may also detect one or more typical patterns of the program data, instructions, etc., in a decrypted data block and compare the instances of the typical patterns to a probability the sequences would appear in a random distribution of bits. Of note, an opportunity to encounter a pattern may be relatively high for valid plaintext, and/or a probability of random noise creating a recognizable pattern may be relatively low. In addition, the logic 52 may implement a probability function to determine whether the unencrypted data includes a random distribution of the plurality of bits. For example, the function may include a probability density function to verify and/or test whether the unencrypted data includes a random distribution of the plurality of bits. Thus, for example, the logic 52 may implement Posterior probability density function to unencrypted data to make the determination.

The logic 52 may also, for example, implement a compression function to determine whether the unencrypted data includes a random distribution of a plurality of bits. For example, a compression function may look for repeating patterns to achieve compressions. In one example, a compression function may look for a string of zero (0) bits, repeated bytes, etc., and the logic 52 may utilize the compression function to determine ordered (and therefore random) unencrypted data.

The logic 52 may determine that data line data will not pass a heuristic rule (e.g., a pattern test, etc.) pre-encryption, and replace at least a part of the dat line data with a fixed pattern and a memory location. The logic 52 may also determine that unencrypted data (e.g., pre-encryption data) includes a random (e.g., apparently random) distribution of a plurality of bits and, in response, cause an integrity value generator 54 to generate and store an integrity value associated with the unencrypted data on a relatively tailored ad hoc basis. The logic 52 may determine whether an integrity value is needed based on a pseudorandom data model and/or a real data model, as shown in FIG. 3A, discussed below.

When the integrity value is needed, an integrity value generator 54 may generate any value that may be used to verify and/or test whether a random distribution of a plurality of bits identified in unencrypted data (e.g., apparent randomness) is a result of a modification to encrypted data or is a result of a legitimate decryption by the decryptor 28 (e.g., the data is valid and apparently random). For example, the integrity value may include an integrity check value (ICV) (e.g., a hash), a message authentication code (MAC) (e.g., the same MAC produced when the same message, secret key, and initialization vector used), a message integrity code (MIC) (e.g., the same MIC produced if the same algorithm is used), a signature (e.g., produced using a private key of a key pair), HMAC (e.g., SHA3 HMAC), and so on, or combinations thereof.

In one example, the logic 52 may compute a hash value (e.g., digest) using the unencrypted data (e.g., message, plaintext, etc.) and compare the hash value to a fetched integrity value (e.g., 128-bit ICV, MAC, etc.) generated by the integrity value generator 54 to verify whether the unencrypted data is a result of a legitimate decryption of original data. In another example, the integrity value generator 54 may generate a copy of a portion of unencrypted data (e.g., pre-encryption data) that is stored in an integrity check line as an integrity value based on a determination by the logic 52 that the unencrypted data includes a random distribution of a plurality of bits.

The illustrated memory controller 22 further includes an operator 56 to combine the copy with a portion of ciphertext of unencrypted data. The operator 56 may, for example, XOR bits of the copy generated from a portion of unencrypted data (e.g., pre-encryption data) with bits from a location of ciphertext of the unencrypted data to generate an XOR result, which may be stored as the integrity value. The operator 56 may also inverse the operation (e.g., XORing with X may be reversed by XORing again with X) when the integrity value is needed to verify the integrity of unencrypted data. For example, unencrypted data (e.g., post-decryption data) may be generated from fetched ciphertext for the unencrypted data, and the logic 52 may determine that the unencrypted data includes a random distribution of a plurality of bits. The operator 56 may, in response, implement an inverse of the XOR to generate the integrity value that is used to verify the unencrypted data.

Notably, the operator 56 may be implemented to avoid a side channel information disclosure attack when an adversary attempts to determine whether a portion of unencrypted data does not change from run to run (e.g., from memory access to memory access). For example, ciphertext of the unencrypted data will change even when the portion of unencrypted data used to generate the copy may not change from run to run (e.g., when another portion of the plaintext changes, bits diffused with encryption, etc.). Thus, an XOR of bits of the copy with bits from a location in ciphertext of the unencrypted data will change the integrity value that is stored from run to run even though the portion of unencrypted data used to generate the integrity value may not change, and an adversary may not be able to determine that the portion of the unencrypted data does not change by checking the integrity value.

Figure 4A:
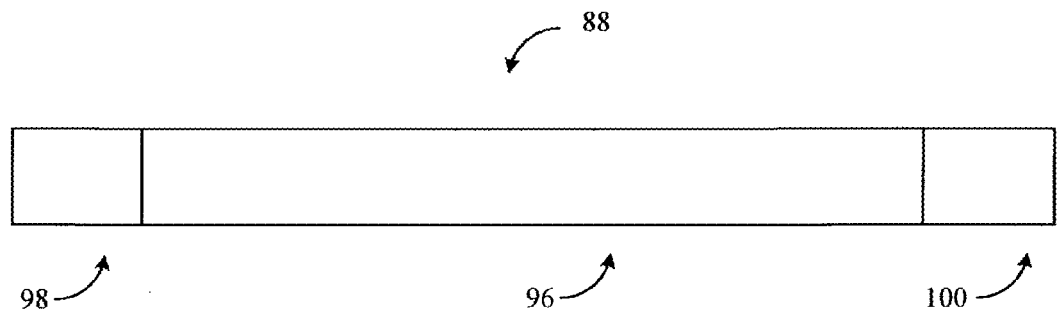
FIGS. 4A-4B are block diagrams of an example of a physical memory address used to determine a key or a tweak, and/or to determine an integrity check line and a slot for an integrity value according to an embodiment.
Figure 4B:
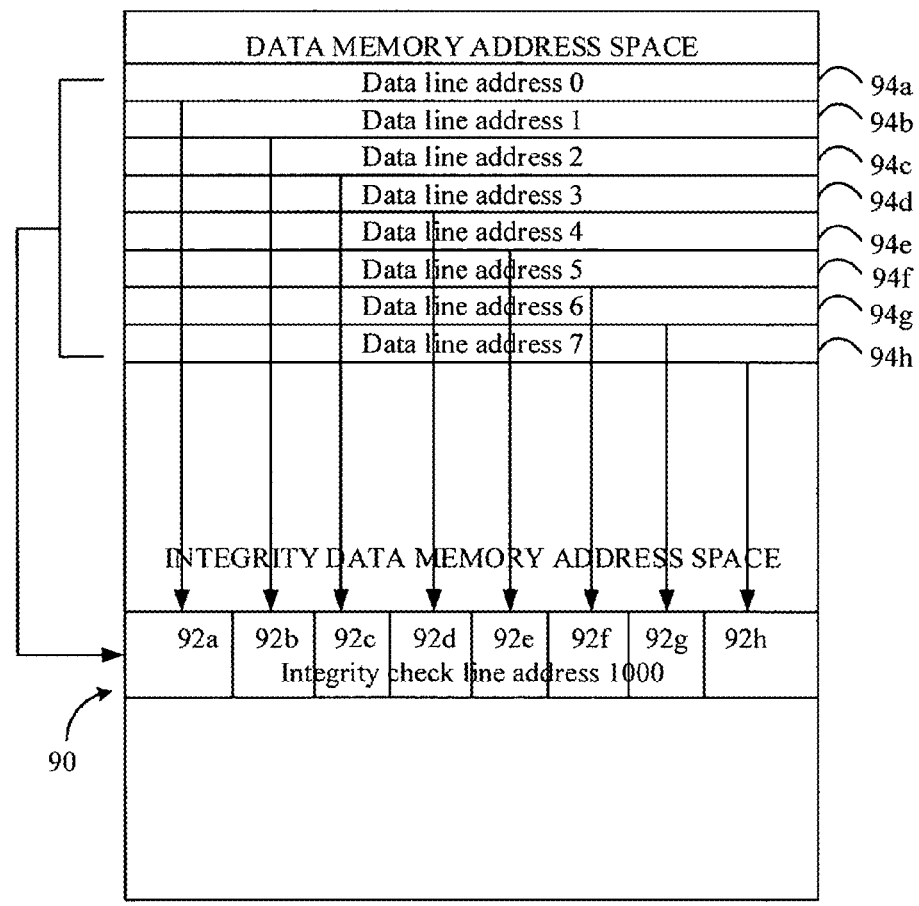

The illustrated memory controller 22 further includes an integrity line selector 58 to select an integrity check line to store an integrity value (e.g., a copy, a MAC, etc.) for the unencrypted data. The integrity line selector 58 may select, for example, an integrity check line for the integrity value that is stored in a region of the memory 12 reserved for integrity data (e.g., a privileged region). In addition, the memory controller 22 includes a slot selector 60 to select a slot for the integrity value from a plurality of slots in an integrity check line. In one example, each slot of an integrity check line may have a predetermined width (e.g., 16 bits, 32 bits, 64 bits, etc.) to hold an integrity value for unencrypted data. For example, an integrity check line may be 512 bits wide and have eight 64-bit wide slots, sixteen 32-bit side slots, etc. that accommodate eight integrity values associated with eight 512-bit data lines, etc. As shown in FIGS. 4A-4B, discussed below, the location of the integrity check line and the slot may be determined from a physical memory address of a data line.

The integrity check line may be encrypted (e.g., in the same manner as previously discussed for a data line, encrypted with wide diffusion over the whole line, etc.) to detect a malicious n-bit change to any location in ciphertext of the integrity check line (e.g., Threefish, etc.). Similarly, the integrity check line may be decrypted such that a malicious n-bit change (e.g., one-bit change, etc.) to ciphertext of the integrity check line may be diffused throughout plaintext generated by decrypting the ciphertext of the integrity check line. The integrity check line may also be encrypted such that a malicious n-bit change to a data block corresponding to a specific integrity value may be diffused throughout only a data block for the integrity value. For example, an integrity value (e.g., a 64-bit value) may be encrypted and decrypted using AES with a fixed block size (e.g., a 128-bit fixed block), wherein a malicious bit change to adjacent data blocks in the integrity check line may not affect the data block for the integrity check value (e.g., two 64-bit integrity values). In this regard, computational efficiency may be achieved during error correction on the integrity check line since only a specific data block may need to be processed to correct an error in the integrity check line.

Notably, virtual memory mappings may be used to limit access to an integrity check region of the memory 12 by different software entities. A user space application's memory allocator may be given access only to integrity values pertaining exclusively to that same application, as granted by the OS. Thus, one application may be prevented from gaining access to the integrity values in regions pertaining to a different application, minimizing cross-application corruption and/or minimizing an application from corrupting the integrity values of the memory 12 belonging to the privileged OS, VMM, and so on. Processor paging structures may map the virtual memory of an application to a corresponding physical memory location of a relevant integrity check region pertaining to the memory allocated for that application. Further, sub-page policy features may allow more granular access, down to specific integrity check memory lines, to be exclusively granted to an application by the OS, the VMM, and so on.

The illustrated apparatus 10 further includes an initializer 62 to set a value of an integrity check line to an uninitialized value. For example, the function detector 44 may determine that the memory 12 is to be accessed for a first time and/or the value selector 54 may determine that a function is to be given access to a physical location in the memory 12 via a key and/or a tweak, and the initializer 62 may, in response, set a value of an integrity check line corresponding to the physical location in the memory 12 to an uninitialized value (e.g., all zeros, all ones, etc.), which indicates that no verifiable data has been written to the memory 12 (and/or the specific physical location).

The memory 12 may, for example, have random data at power up and the initializer 62 may set all integrity values in all integrity check lines to "uninitialized" to minimize faults (e.g., mismatches between power up integrity values and the random data) when the cores 16, 18 read the memory 12 for the first time. As discussed above, privileged software (e.g., OS kernel, VMM, etc.) may access a region of the memory 12 reserved for integrity data when, for example, the OS allocates pages of memory for a first time (before memory is used or written). The OS may, in this case, skip an integrity check involving "uninitialized" integrity values for those physical memory pages until data is first written. In this case, an integrity value in an integrity check line may be set to "uninitialized" when pages of virtual memory are first assigned to physical memory by the OS to avoid latency of initializing all integrity values at once (e.g., by the BIOS on boot). Thus, boot up time of may be improved since integrity values may be set to "uninitialized" page-by-page at the time of first use rather than initially setting all the integrity values to "uninitialized".

Similarly, software may re-assign memory (e.g., free memory) or refresh memory with different keys and/or tweaks, which may cause a fault due to mismatches when the memory is read using an incorrect key (e.g., an obsolete key) and/or an incorrect tweak. In this case, an integrity value may be set to "uninitialized" until a function reads assigned or refreshed memory with a present key and/or tweak (e.g., the function takes ownership with a correct key and may set a present integrity value). Thus, "uninitialized" integrity values may be changed to usable and correct integrity values for data lines presently in the memory 12.

In one example, the memory controller 22, when intercepting uninitialized settings to the integrity check region, and using unused address bits, a cache or cache coherency entity may snoop the previous address value (differing only in the unused address bits) to force eviction of the old cache lines from the cache 20. In this case, authorized software that sets an integrity value to uninitialized may also specify a corresponding previous domain value (address, or unused address bits) that is to be evicted from the cache 20.

The integrity check region may be set as a write-through or write combining memory type, where writes by authorized software to the integrity check region are first intercepted by the memory controller 22, causing the appropriate cache evictions of the data lines corresponding to the integrity value slots, before the integrity values are updated in external memory. Alternatively, the cache 20 may treat the unused address bits as aliasing to the same cache locations even though the addresses are different. In addition, the unused address bits may be stored and forwarded by the cache 20 as additional metadata for each cache line indicating the corresponding key and/or tweak.

Additionally, the pattern adder 40, discussed above, may add a recognizable non-random pattern to an integrity check line before encryption and storage. The recognizable non-random pattern (e.g., pad bits) may be evenly interleaved across the integrity check line to simplify integrity check line slot computation (e.g., in hardware). Thus, integrity values in each of the slots may be associated with individual non-random patterns (e.g., pad bits interleaved after each integrity value in each slot). The recognizable non-random pattern may also be distributed at other locations, such as the end of the integrity check line, and so on. Thus, integrity values in each of the slots may be associated with the same non-random pattern in the integrity check line. The recognizable non-random pattern and/or the integrity check value of an integrity check line may be used as error correction in an integrity action.

The logic 52 may apply the following example heuristic rule, for example as a continuation of the example heuristic rule described above, to implement an integrity action:

```
Else:
    Fetch integrity value (copy) from DRAM
    If copy and/or data invalid
        Integrity action
    else
        Data integrity is good; pass data to processor
```

The integrity action may include preventing access to the unencrypted data when the unencrypted data is corrupt. The logic 52 may also issue a notification to, for example, a predetermined location (e.g., debug environment, log, etc.), to an individual (e.g., administrator, programmer, device owner, etc.), and so on, to implement preventive action. In addition, the logic 52 may issue a notification to a function (e.g., an OS) to notify of, for example, a use-after-free attack (or error), a replay attack (or error), a buffer overflow/underflow attack (or error), and so on, wherein the OS may automatically act to prevent or address the attack. For example, the OS may change the memory 12 back to a prior uncorrupted state, isolate a program attempting to replay data with an obsolete key, erase a dangling pointer, isolate a program incrementing past allocated memory, and so on, or combinations thereof.

The integrity action may also include error correction for unencrypted data such as, for example, plaintext of a data line in the memory 12, plaintext of an integrity check line in the memory 12, and so on, or combinations thereof. In this regard, the illustrated memory controller 22 includes an error corrector 64 to implement error correction for the unencrypted data when the unencrypted data includes a random distribution of the plurality of bits and/or when a recognizable non-random pattern that is expected in the unencrypted data is absent.

The error corrector 64 may, for example, implement a bit flip operation to correct the error in the unencrypted data. The error corrector 64 may implement a one-bit flip operation by flipping a first bit in ciphertext of the unencrypted data while holding the rest of the bits to generate modified ciphertext of the unencrypted data, flipping the first bit back, flipping a second bit in the ciphertext of the unencrypted data while holding the rest of the bits to generate further modified ciphertext of the unencrypted data, and so on, until all bits have been flipped (e.g., bits of ciphertext of an entire data line, bits of ciphertext of an entire integrity check line, bits of ciphertext of an integrity check line only for a fixed block size, etc.). Notably, when a bit is flipped resulting in patterns in the unencrypted data or integrity check line, the apparatus 10 may conclude and/or assume that the bit that was flipped is presently in error, and allows the apparatus 10 to correct the error in the corresponding ciphertext.

Similarly, the error corrector 64 may implement a two-bit flip operation by flipping every two-bit combination in ciphertext to generate modified ciphertext of the unencrypted data. The bit flip operations implemented by the error corrector 64 may be based on, for example, any or all possible bit flip operations, bit error granularity (e.g., a one-bit flip operation for a one-bit error analysis, etc.), and so on. In addition, all modified ciphertext may be decrypted to generate all modified plaintext at the end of all bit flip operations, and/or each modified ciphertext may be decrypted to generate modified plaintext after each bit flip operation. In either case, the modified plaintext may be used to determine whether a specific bit flip operation corrected the error.

The illustrated memory controller 22 further includes a verifier 66 to determine a mismatch/match between plaintext of an integrity value (e.g., a copy stored in an integrity check line) and plaintext of a data line (e.g., a portion copied of the data line), which indicates error corruption or validity of the integrity value and/or of the data line. The verifier 66 may also recognize a non-random pattern (or absence thereof) to indicate the integrity of unencrypted data. In either case, the verifier 66 may recognize that data has been restored by a bit flip operation, and the error corrector 64 may replace ciphertext with modified ciphertext corresponding to the bit operation that restored the non-random pattern, that resulted in plaintext with the largest order (e.g., patterns, etc.), and/or that resulted in a match between the integrity value (if used) and the data line.

The logic 28 may allow access to the unencrypted data when the data does not include a random distribution of a plurality of bits, when the unencrypted data is corrected, when the data line matches an integrity value (that itself is validated), and so on, or combinations thereof. For example, the plaintext of the data line may be placed in the cache 20. The uncorrupted plaintext of the data line may, for example, be passed to a last level cache line. Thus, the plaintext of the data line data may be accessible to the cores 16, 18, and/or may be encrypted and stored for later use in the memory 12.

Although not illustrated in FIG. 1, the apparatus 10 may include other elements on chip with the processor 14. For example, the processor 14 may include input output (IO) control logic integrated with the memory controller 22. In addition, the apparatus 10 may include, for example, an IO module, sometimes referred to as a Southbridge of a chipset, that functions as a host device and may communicate with, for example, a front/rear image sensor (e.g., a two-dimensional camera, a three-dimensional camera, etc.), a microphone, a display (e.g., screen), a motion sensor (e.g., an accelerometer, a gyroscope, etc.), mass storage (e.g., hard disk drive/HDD, optical disk, flash memory, etc.), a network interface to provide a wide variety of communication functionality (e.g., cellular telephone, WiFi, WiMax Global Positioning Systems (GPS), spread spectrum (e.g., 900 MHz), other radio frequency (RF), etc.). The processor 14 and the IO module may, for example, be implemented as a system on chip (SoC).

Additionally, while examples have shown separate components for illustration purposes, it is should be understood that one or more of the components of the apparatus 10 may be combined, may reside in the same and/or different physical and/or virtual locations, and so on, or combinations thereof. For example, the logic 52 may include one or more of the components of the memory controller 22 to execute corresponding functionality thereof, which may reside in the same or different location as the cores 16, 18, the memory 12, and so on, or combinations thereof. In addition, one or more components of the memory controller 22 may be implemented in computer program code, such as a software value selector that may interface with one or more components of the memory controller 22 implemented in logic hardware.

Figure 2A:
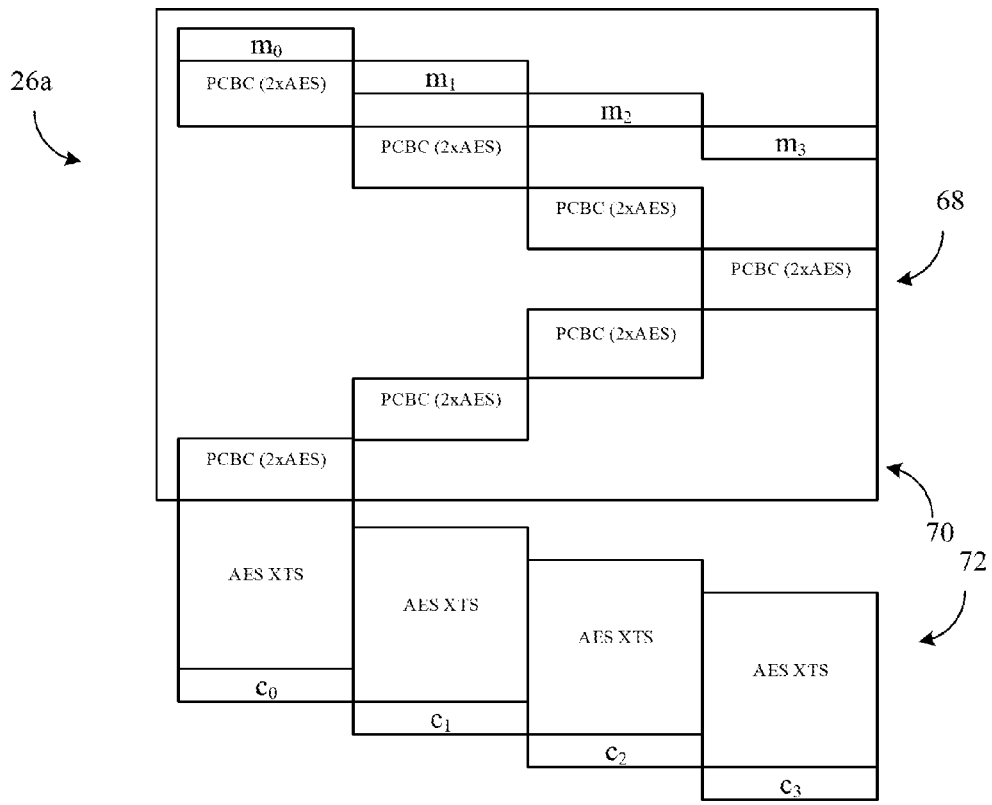
FIGS. 2A-2D are block diagrams of examples of diffusers and inverse diffusers according to an embodiment.
Figure 2B:
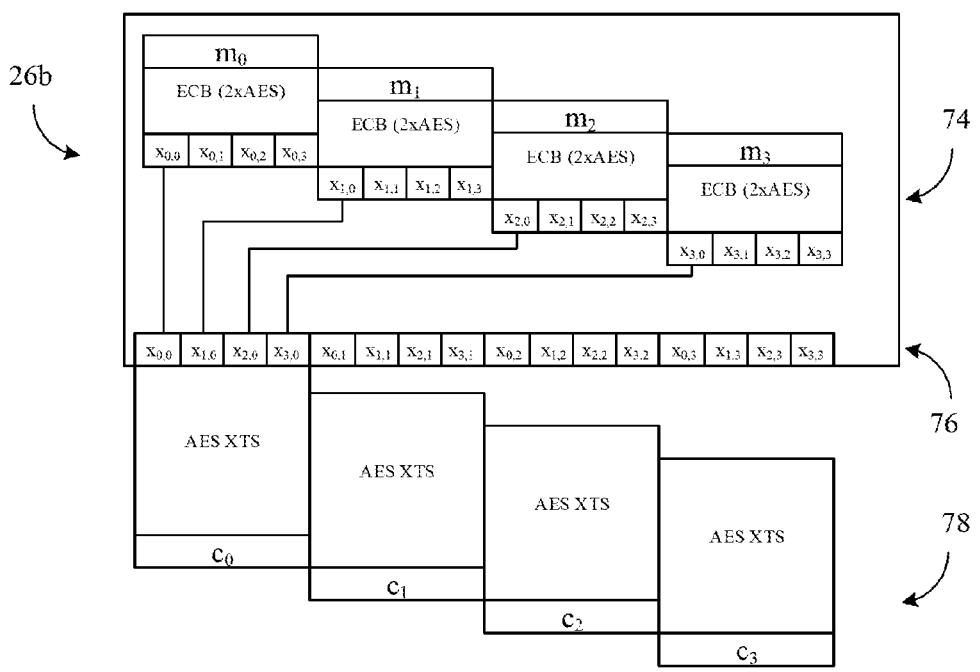
Figure 2C:
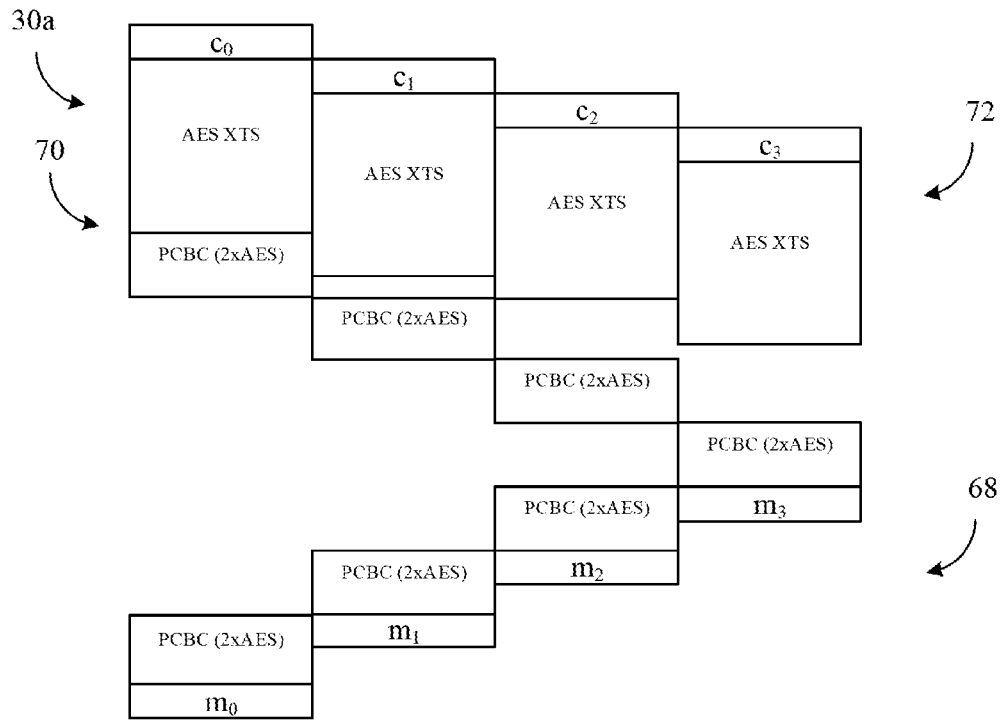
Figure 2D:
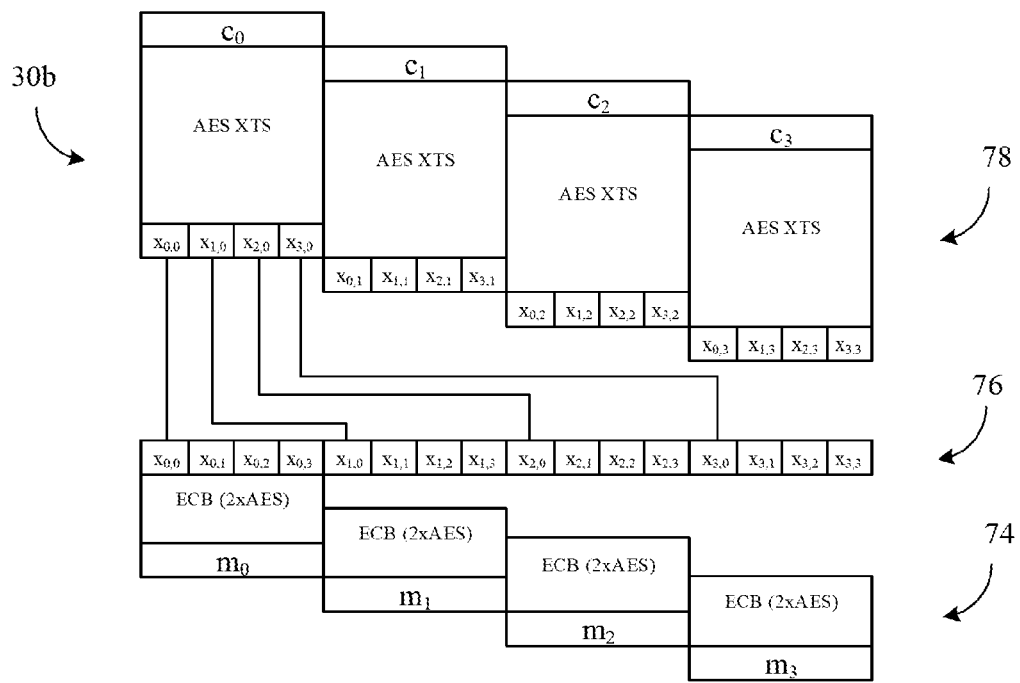

FIGS. 2A-2C show example diffusers 26a, 26b and inverse diffusers 30a, 30b, respectively, to diffuse bits across an entire cache line according to an embodiment. The diffuser 26a is a type of encryptor that includes an AES-PCBC pipeline 68 to generate intermediate ciphertext 70 using at least two rounds of AES in PCBC mode for each data block and an AES XOR encrypt XOR based tweaked codebook mode with ciphertext stealing mode (AES-XTS) pipeline 72 to generate final ciphertext from the intermediate ciphertext 70 using a number of encryption rounds that provides sufficient confidentiality. In the illustrated example, $m_0$-$m_3$ may be 128-bit data blocks of a 512-bit data line.

The first data block ($m_0$) may receive an initialization vector to mix with plaintext, and each successive data block ($m_1$-$m_3$) may be encrypted such that ciphertext from a previous data block is mixed with plaintext of a present data block before encryption. Encryption may be accomplished forward (e.g., $m_0$ to $m_1$ to $m_2$ to $m_3$) and backward (e.g., $m_2$ to $m_1$ to $m_0$) to ensure that a modification of any data block's plaintext affects the ciphertext of all data blocks, and reciprocally, a modification of any data block's ciphertext affects the plaintext of all data blocks.

Two rounds of AES may be sufficient to diffuse the bits within each data block. Thus, a current data block may wait for an immediately preceding data block to complete two rounds of AES. Given the sequential nature of PCBC mode, the total latency may be determined to be 14 AES rounds (e.g., 7×2). The intermediate ciphertext 70 may be forwarded to the AES-XTS pipeline 72 to accomplish encryption block by bock ($C_0$-$C_3$) for ensuring sufficient confidentiality of final ciphertext (e.g., using 10 rounds). The final ciphertext may be written to the memory 12.

The diffuser 26b is a type of encryptor that includes an AES-ECB pipeline 74 to generate intermediate ciphertext 76 using at least two rounds of AES in ECB mode for each data block and a mixture of ciphertext for each data block $m_0$-$m_3$. The diffuser 26b is extended by an AES-XTS pipeline 78 to generate final ciphertext from the intermediate ciphertext 76 using a number of encryption rounds that provides sufficient confidentiality. Since AES-ECB may be accomplished in parallel, there is no dependency between data blocks.

In the illustrated example, a first portion of the intermediate cyphertext 76 includes a predetermined portion (e.g., first 32-bits) of each data block $m_0$-$m_3$ ($X_{0,0}$, $X_{1,0}$, $X_{2,0}$, $X_{3,0}$) after AES-ECB, a second portion of the intermediate cyphertext data 76 includes a predetermined portion (e.g., second 32-bits) of each data block $m_0$-$m_3$ ($X_{0,1}$, $X_{1,1}$, $X_{2,1}$, $X_{3,1}$) after AES-ECB, and so on. The intermediate ciphertext 76 may be forwarded to the AES-XTS pipeline 78 to accomplish encryption block by bock ($C_0$-$C_3$) for ensuring sufficient confidentiality of final ciphertext (e.g., using 10 rounds of AES). The final ciphertext may be written to the memory 12.

The inverse diffuser 30a is a type of decryptor that executes the inverse of the diffuser 26a. For example, the inverse diffuser 30a may apply AES-XTS decryption using the AES-XTS pipeline 72 block by bock ($C_0$-$C_3$) in the inverse order to encryption by the diffuser 26a, and AES-PCBC decryption using the AES-PCBC pipeline 68 in the inverse order to encryption by the diffuser 26a. Similarly, the inverse diffuser 30b is a type of decryptor that executes the inverse of the diffuser 26b. For example, the inverse diffuser 30b may apply AES-XTS decryption using the AES-XTS pipeline 78 block by bock ($C_0$-$C_3$) in the inverse order to encryption by the diffuser 26b, and AES-ECB using the AES-ECB pipeline 74 in the inverse order to encryption by the diffuser 26b (e.g., apply AES-XTS decryption, re-map bits, and apply AES-PCB decryption in reverse order).

Figure 3:
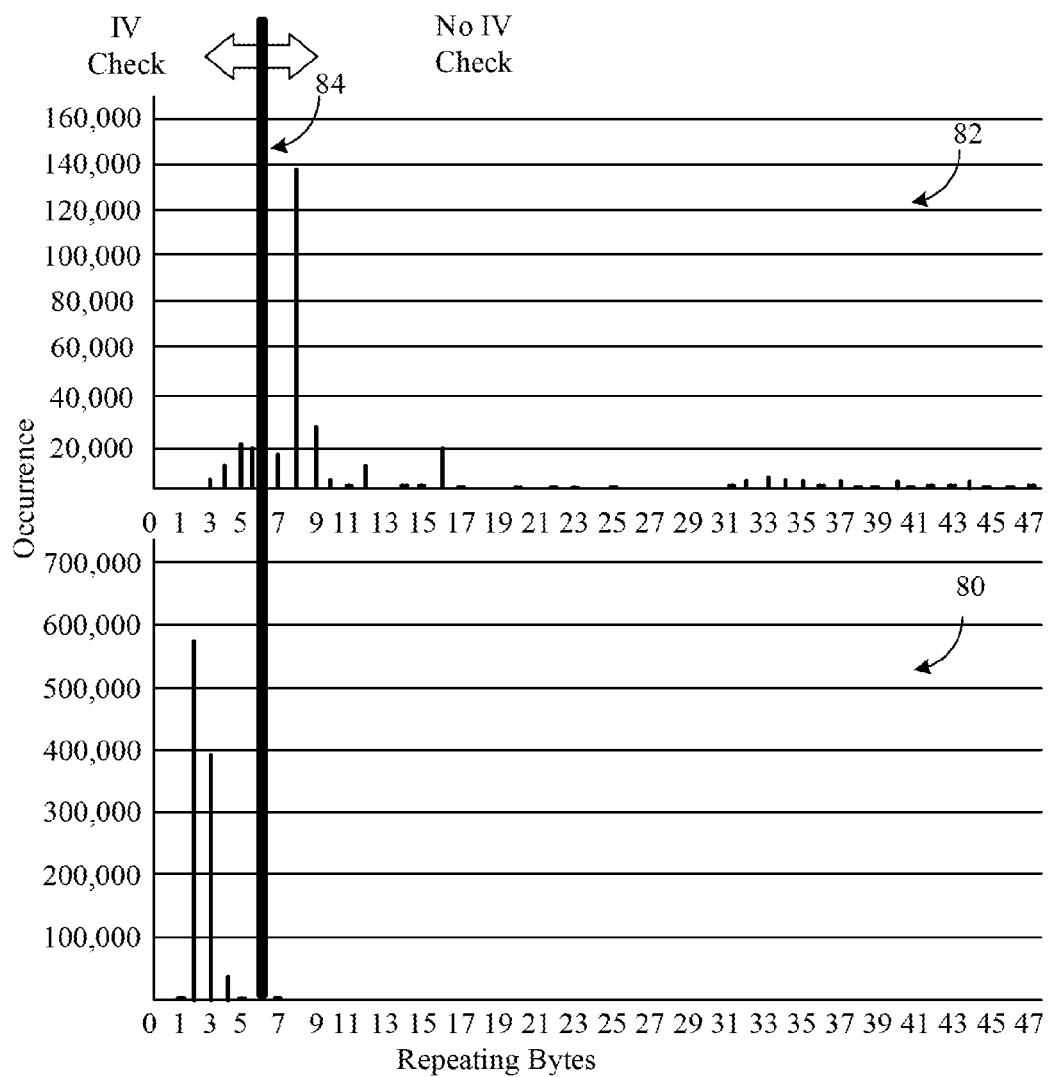
FIG. 3 is an example of graphs to determine whether an integrity value is needed according to an embodiment.

Turning now to FIG. 3, an example of graphs are shown to determine whether an integrity value is needed according to an embodiment. In the illustrated example, a pseudorandom data pattern (PRD) model represented by example graph 80 and a real data (RD) model represented by example graph 82 are shown to determine an integrity value threshold 84. The PRD model represented by the graph 80 includes one million random number samples, and the RD model represented by the graph 82 includes a one-gigabit trace of memory with repeated byte values in a data line of 64 bytes (512 bits).

Notably, the integrity value threshold 84 may be used to determine whether to generate an integrity value when, for example, unencrypted data is pre-encryption data (e.g., original data). The integrity value threshold 84 may also be used to determine whether an integrity value is fetched to verify the integrity of the unencrypted data when, for example, the unencrypted data is post-decryption data (e.g., decrypted plaintext data of a data line).

The graph 80 shows that a probability of a data unit (e.g., a byte, although less or more than a byte can be used, etc.) randomly repeating in PRD pattern is relatively high below about seven repeating bytes (e.g., two repeating bytes, etc.), and is practically zero above about seven repeating bytes. The graph 82 shows a larger number of repeating bytes (e.g., 33 bytes repeating, etc.) above about seven repeating bytes since, for example, a program may initialize memory in all zeros in real data. Thus, the integrity value threshold 84 may be set to about seven repeating bytes, which represents a low enough probability of repeating bytes occurring randomly based on the PRD model and a high enough probability of repeating bytes actually occurring in real data based on the RD model. In this regard, there may be a one million probability of a false positive at a threshold of about seven repeating bytes. The integrity value threshold 84 may, however, be set higher for real data since a larger number of repeating bytes above about seven repeating bytes are observed in real data.

Accordingly, an integrity value may not be needed to determine whether unencrypted data is corrupt in about eighty to ninety percent of all real data. For example, no integrity value may need to be stored when the unencrypted data (e.g., pre-encryption data) includes a number of repeating bytes more than the integrity value threshold 84. Similarly, no integrity value may be needed when the unencrypted data (decrypted plaintext data of a data line) includes a number of repeating bytes more than the integrity value threshold 84 since, for example, a first integrity check may determine that the unencrypted data does not include a random distribution of a plurality of bits (e.g., plaintext data is sufficiently ordered and therefore not corrupt) based on a sufficient number of repeating bytes (e.g., seven bytes or more) relative to a threshold value.

When unencrypted data (decrypted plaintext of a data line) includes less repeating bytes than the integrity value threshold 84, however, an integrity value may be needed since the probability of, for example, less than seven repeating bytes randomly occurring in PRD is relatively high, as shown in the graph 80, even though real data may commonly have below seven repeating bytes, as shown in the graph 82. Thus, pre-encryption plaintext may be checked against the integrity value threshold 84 to determine whether an integrity value is to be generated and stored for the pre-encryption plaintext, and/or post-decryption plaintext may be checked against the integrity value threshold 84 to determine whether an integrity value is to be fetched to verify integrity.

Notably, an integrity value threshold may also be determined based on a repetition of a data unit (e.g., bytes repeating, etc.) within a range of values (e.g., about 100-120) for the data unit. For example, specific ASCII byte values may be more probable with similar distribution for Unicode and other text formats (e.g., there is a higher occurrence of some byte values than others in ASCII and similar data, presumably instruction opcodes in binary code sections as well). In this regard, common repeating byte values within a range may be used to create a heuristic for differentiating data from random sequences of bytes.

In one example, using the repetition of the data unit within the range of values may shift an integrity value threshold lower relative to using the repetition of the data unit alone. Thus, for example, a probability of a byte having a value between about 100 and 200 for ASCII repeating four or more times randomly may be less than the byte repeating four or more times randomly within the entire value range, and an integrity value threshold may be set to, e.g., four repeating bytes within a range of values between about 100 and 200 rather than, e.g., seven repeating bytes alone, as shown in FIG. 3.

Multiple sets of repeating bytes may further reduce false positive rates. Similarly, other heuristics may be implemented to reduce false positive rates (e.g., periodicy, runs of common values, etc.). Frequency analysis may also be performed at different resolutions, such as sub-byte granularity (e.g., four bits, etc.), coarser granularities such as recurrence of multi-byte values, and so on, or combination thereof.

FIGS. 4A-4B show an example of a physical memory address 88 that may be used to determine a key or a tweak, discussed above, and/or an integrity check line 90 and a slot 92 (92a-92h) for an integrity value associated with a data line 94 (94a-94h) according to an embodiment. The physical memory address 88 includes a plurality of address bits that may be partitioned into a plurality of sections. In the illustrated example, the physical memory address 88 includes an intermediate section 96 that includes a plurality of intermediate address bits, a most significant section 98 that includes a plurality of most significant address bits, and a least significant section 100 that includes a plurality of least significant address bits.

Notably, not all bits of memory may be addressable since, for example, the actual memory deployed in a computing platform may be substantially less than a maximum amount of possible memory for which a maximum amount of address space is provisioned. For example, not all 64-bits (of a 64-bit system) of physical memory are addressable (e.g., occupied with sufficient DIMM's). Thus, otherwise unused bits of the physical memory address 88 may be used to determine, for example, which key and/or tweak is to be used when encrypting and/or decrypting memory for a particular data line.

The key domain and/or the tweak domain for the physical memory address 88 may be any size. In the illustrated example, a value selector may use the most significant section 98 to derrive a key and/or a tweak for the same physical memory address 88. For example, a software value selector may select from among 16 keys (and/or 16 tweaks) defined by four most significant bits in the most significant section 98. In one example, setting the first bit to zero (0000) or to one (0001) may be used to derive the key tweak (e.g., if set bit to 1, encrypt with 1, if set to 0, encrypt with 0) or the tweak (e.g., if set bit to 1, use 1 in address for tweak, if set to 0, use 0 in address for tweak, etc.). Thus, different keys and/or tweaks may be used. In this case, a first integrity check will fail when data is decrypted with a wrong key and/or a wrong tweak to generate a random distribution of a plurality of bits, and/or a second integrity check will fail when an integrity value is checked against improperly decrypted data.

Additionally, an integrity check line and/or a slot may be determined and selected from the physical memory address 88. For example, an integrity line selector may select the integrity check line from the intermediate bits in the intermediate section 96 of the physical memory address 88, and/or the slot selector may select the slot from the least significant bits of the least significant section 100 of the physical memory address 88. As shown in FIG. 4B, data lines may be stored in data memory address space and integrity values (e.g., an ICV, a copy, etc.) may be stored in integrity data address space. For example, the data lines in the data memory address space begin at address 0, and the integrity check lines in the integrity data memory address space begin 1000 cache lines away at address 1000.

While various strategies may be implemented to map between each of the data lines and each of the integrity check lines (and/or each of the slots thereof) in embodiments, using a data line address may be an efficient approach to determine and select an appropriate integrity check line and an appropriate slot. For example, no lookup table may be needed to determine the appropriate integrity check line and/or the slot for an integrity value. In this regard, a value defined by intermediate bits of each of the data lines 94a-94h may map to the integrity check line 90, indicated by the arrows from the data lines 94a-94h with the addresses 0-7 to the integrity check line 90, and a value defined by least significant bits of each of the data lines 94a-94h may map to the appropriate slot 92a-92h that is to accommodate particular integrity values for each of the data lines 94a-94h, indicated by the location of the arrows.

Generally, selection of an appropriate integrity check line and an appropriate slot may be based on a function, such as (D−Dstart)/8+Istart, wherein the address Dstart of the start of the data memory region is subtracted from the address D of the data line that is to be accessed, wherein Istart is the start of the integrity value memory address space, and wherein the integer division by 8 may be done by shifting the address offset right by 3 (or choosing top bits minus the first 3 bits). Moreover, once the appropriate integrity check line is fetched, the offset for the appropriate slot may be determined by (D−Dstart) %8, wherein the modulo operation may select the least significant 3 bits of the address. It should be understood that while 3 bits may be used to select from 8 slots on an integrity check line, the integrity check lines may be different in size (e.g., half the size), such that 4 bits may be used to select from 16 slots per integrity check line to save on integrity value overhead, and so on.

The intermediate bits and/or the least significant bits may also be used as an index to an array of assigned locations stored in a privileged/secure memory location to identify the mappings. There may also be an implied mapping, wherein the first slot 92a of the first integrity check line 90 may be automatically selected for the data line 94a having address 0, the second slot 92b of the first integrity check line 90 may be automatically selected for the data line 94b having address 1, and so on. Any functions, mappings, and/or assignments may be used, such that the data lines 94a-94h with the addresses 0-7 may be mapped to anywhere in the integrity data address space, may be mapped to anywhere within the integrity check line 90, and so forth.

Notably, truly random data may typically be accessed adjacently and followed by other random data. For example, a program may decrypt a file or video with sequential block access. Such workloads may overly benefit from the adjacency of integrity values stored together on an integrity check line in memory. In addition, such workloads may compliment each other, wherein random access benefits from pattern checking heuristics and contiguous access data benefits from groupings of multiple integrity values in an integrity check line. Moreover, previously read integrity check lines may be cached for further lookups to increase relative efficiency (e.g., particularly in workloads that have relatively high locality).

Figures 5, 6:
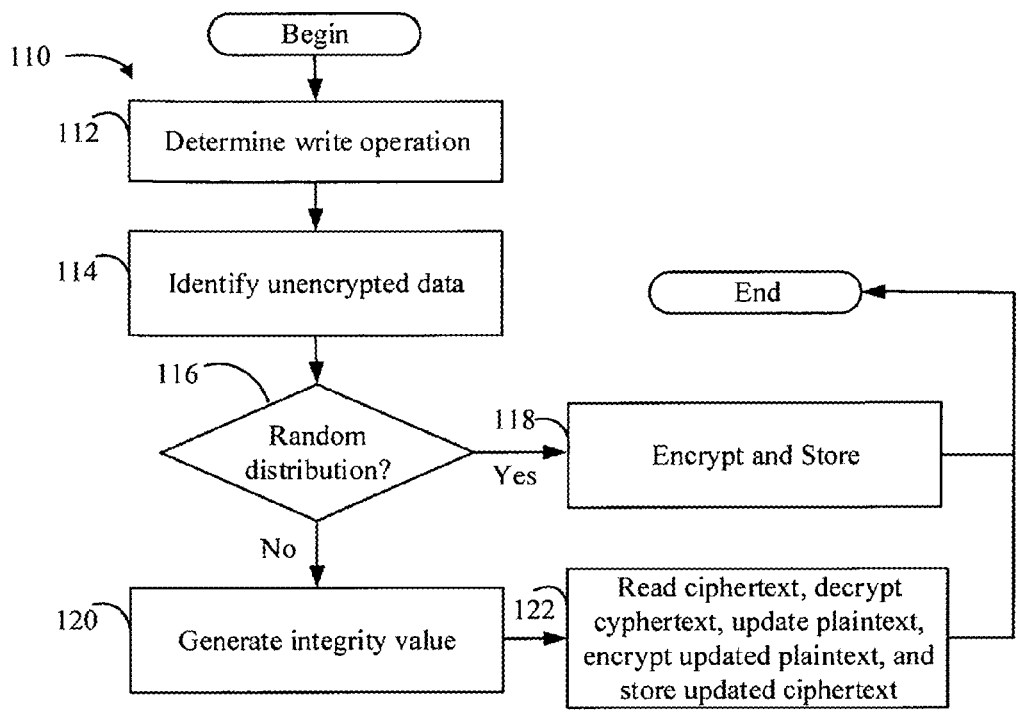
FIG. 5 is a flowchart of an example of a method for a write operation to provide memory integrity according to an embodiment.
FIG. 6 is a flowchart of an example of a method to generate an integrity value to provide memory integrity according to an embodiment.

Turning now to FIG. 5, an example of a method 110 for a write operation is shown according to an embodiment. The method 110 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 110 may be written in any combination of one or more programming languages, including an object oriented programming language such as Java, Smalltalk, C++ or the like and conventional procedural programming languages, such as the "C" programming language or similar programming languages.

Illustrated processing block 112 determines that a write operation is to be executed, and illustrated processing block 114 identifies unencrypted data including a plurality of bits that is involved in the write operation. The unencrypted data may include, for example, plaintext of a data line. In addition, the write operation may originate from a CPU/Cache that is to write a data line/cacheline to external memory (e.g. DRAM). Block 116 determines whether the plurality of bits includes a random distribution. For example, block 116 may utilize a heuristic (e.g., a compression function, repeating bytes beyond a threshold value, etc.) to determine whether the data line to be written to memory approximates random or not.

If block 116 determines that the data line is not random or is ordered (e.g., sufficiently ordered, includes a pattern above a threshold, does not include a random distribution of bits, etc.), illustrated processing block 118 encrypts the data line and sends ciphertext of the data line to the memory. If block 116 determines that the data line is random (e.g., is insufficiently indistinguishable from random), illustrated processing block 120 generates an integrity value for the data line. In this regard, the integrity of the data line (e.g., random data) may be validated using the integrity value for the data line when the data line is read back from memory.

Illustrated processing block 122 reads ciphertext of an integrity check line for the data line (e.g., corresponding to the data line), decrypts the ciphertext to generate plaintext of the integrity check line, updates the plaintext with the integrity value generated by block 120 to generate updated plaintext of the integrity check line (e.g., updates the integrity check line at the corresponding integrity value slot), encrypts the updated plaintext to generate updated ciphertext of the integrity check line, and stores the updated ciphertext. Block 122 may replace an existing integrity value in the plaintext of the integrity check line with the integrity value generated by block 120 to generate the updated plaintext of the integrity check line, which may be encrypted and stored in the memory.

In addition, block 122 may store any or all integrity check lines locally to cache memory to speed up adjacent memory accesses by providing access to recently cached integrity check lines rather than immediately storing integrity check lines to main memory. In this regard, an evicted integrity check line may be written to main memory when the cache memory runs out of space. For example, a least recently used (LRU) cache eviction process may be utilized.

FIG. 6 shows an example of a method 124 to generate an integrity value according to an embodiment. The method 124 may be implemented, for example, as a set of logic instructions stored in a machine- or computer-readable storage medium. Illustrated processing block 126 selects a portion of unencrypted data, such as pre-encryption plaintext of a data line, to generate a copy of the portion. In one example, the copy of the portion may be stored as an integrity value in an integrity check line for the data line. Illustrated processing block 128 combines the copy of the portion of the unencrypted data with a portion of encrypted data. For example, block 128 may XOR the copy of the portion of the plaintext of the data line (e.g., 64 bits, sequential or non sequential) with a portion of ciphertext of the data line (e.g., 64 bits, sequential or non sequential etc.) to generate the integrity value (e.g., an XOR result).

Accordingly, block 128 may hide whether the portion of the plaintext that is copied is changed or not (with larger portions having a lower probability of collision). For example, the portion of the plaintext used to make the copy that is stored in the integrity check line may not change, and therefore the integrity value may not change. In this case, an adversary may observe the integrity value to gain information about the portion of the plaintext (e.g., that it does not change) in a side channel attack. Since ciphertext of the plaintext data may always change (e.g., when another portion of the plaintext changes, bits diffused with encryption, etc.), block 128 may provide a different integrity value for the copy of the portion of the plaintext whether or not the portion of the plaintext changes. The illustrated approach may also save die area and/or improve relative performance by not requiring a secondary secure hash such as SHA or MD5. In addition, the integrity value may be a SHA HMAC value calculated over the plaintext (or, alternatively, the ciphertext) of the data line, which may be truncated and stored in a corresponding slot of an integrity check line.

Illustrated processing block 130 reads ciphertext of an integrity check line for the data line, decrypts the ciphertext to generate plaintext of the integrity check line, and updates the plaintext with the integrity value generated by block 128 to generate updated plaintext of the integrity check line. Block 128 may, for example, replace an existing integrity value in the plaintext of the integrity check line with the integrity value generated by block 128 to generate the updated plaintext of the integrity check line.

Illustrated processing block 132 encrypts the updated plaintext to generate updated ciphertext of the integrity check line, and stores the updated ciphertext. Block 132 may, for example, encrypt the updated plaintext using a key known only to an authorized entity, such as privileged software, a trusted execution environment (TEE), a secure processor, a memory controller, a memory controller encryptor/decryptor (which may use a secret key to read and update integrity check lines), and so on. In addition, the encryption (e.g., using a fixed block size, using an expandable block size, using a diffuser, etc.) and/or the value (e.g., a key, a tweak, etc.) may be same or different than the encryption and/or the value used to encrypt the data line. Moreover, block 132 may store any or all integrity check lines locally to cache memory to speed up adjacent memory accesses by providing access to recently cached integrity check lines rather than storing integrity check lines to main memory. In this regard, an evicted integrity check line may be written to main memory when the cache memory runs out of space.

Figure 7:
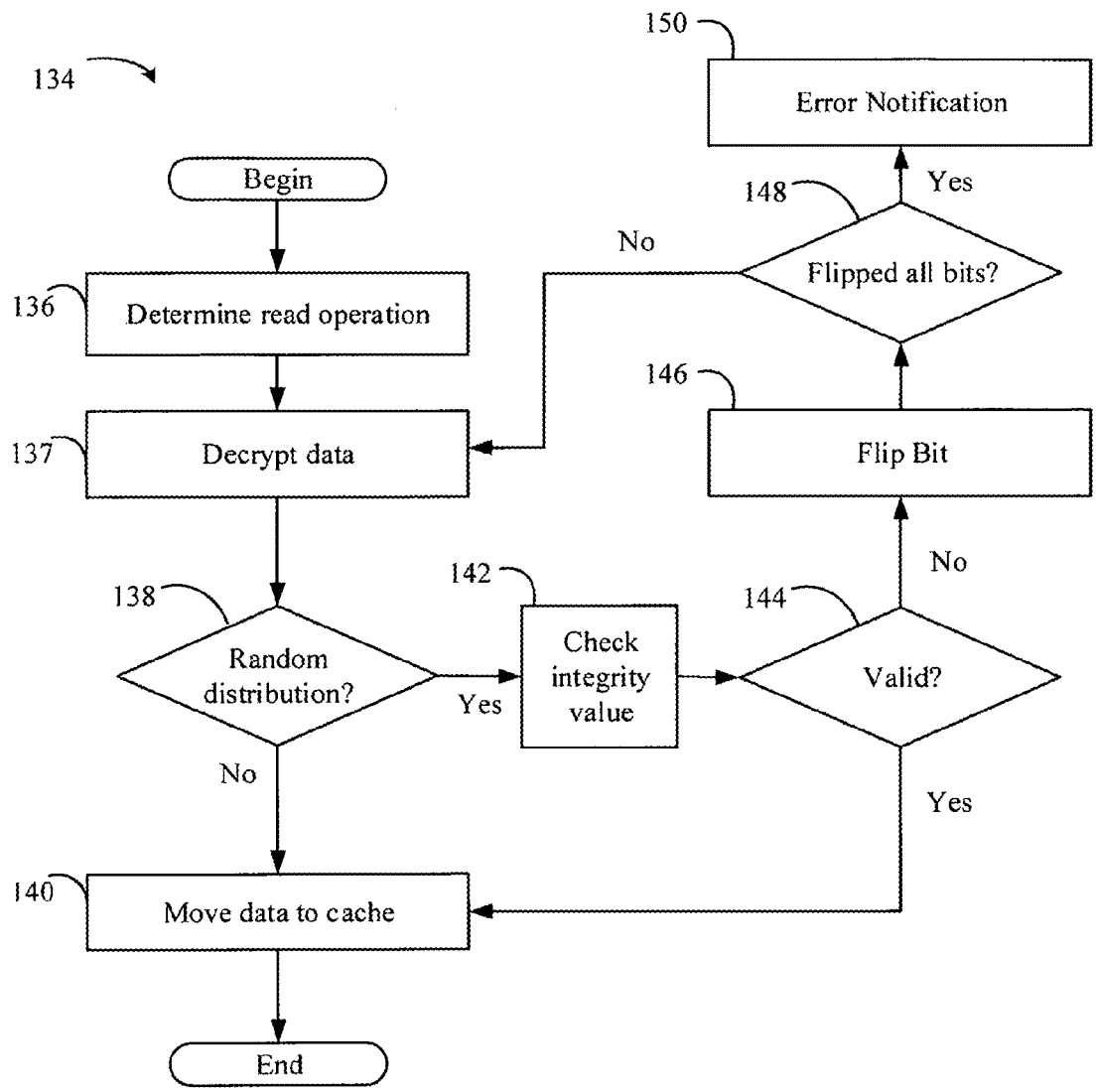
FIG. 7 is a flowchart of an example of a method for a read operation to provide memory integrity according to an embodiment.

Turning now to FIG. 7, an example of a method 134 for a read operation is shown according to an embodiment. The method 134 may be implemented, for example, as a set of logic instructions stored in a machine- or computer-readable storage medium. Illustrated processing block 136 determines that a read operation is to be executed, and illustrated processing block 137 fetches and decrypts encrypted data stored in memory such as, for example, ciphertext of a data line to generate plaintext of the data line. In one example, the read operation may include a cache line that is being read from external memory to a memory controller. Block 138 determines whether a plurality of bits of the plaintext or resulting plaintext includes a random distribution.

For example, block 138 may utilize a heuristic (e.g., a compression function, etc.) to determine whether the data line read from memory approximates random or not. Notable, this may be the same determination function that is run on a memory write operation to determine if plaintext is random (e.g., is insufficiently indistinguishable from random) that the memory write should also calculate and separately store an integrity value. In this case, these determination functions are related. If block 138 determines that the data line is not random or is ordered (e.g., includes a pattern above a threshold, does not include a random distribution of bits, etc.), illustrated processing block 140 moves the data line to cache memory. If block 138 determines that the data line is random, then an integrity value (if any) is checked. If there is no integrity value and/or if the second integrity check involving the integrity value fails (that is, both the implicit pattern/not random check fails and the integrity value fetched from memory also does not match), then error correction may be implemented for the plaintext. In this case, a bit flip operation may be implemented to correct an error.

Illustrated processing block 142 checks an integrity value when block 138 determines that the data line is random. The integrity value may include, for example, a copy of a portion of pre-encryption plaintext data that is stored, whether or not the copy is pre-processed (e.g., XOR result, a SHA HMAC value, etc.). Block 142 may read ciphertext of an integrity check line from memory, decrypt the ciphertext to generate plaintext of the integrity check line, and read the integrity value from the plaintext (which may include an inverse of a Boolean operation used to generate the integrity value used). Block 142 may also read a previously locally cached integrity check line to read a locally cached integrity value.

In either case, block 144 determines whether the plaintext of the data line is valid (even though it is apparently random). For example, block 144 may determine whether the integrity value matches a portion of the plaintext of the data line read when the integrity value is a copy. If block 144 determines the plaintext of the data line is valid (e.g., a match), block 140 moves the plaintext of the data line to cache and feeds the plaintext through encryption for storage. If block 144 determines that the plaintext of the data line is not valid, for example by a mismatch from a comparison between the integrity value and the plaintext of the data line, illustrated processing block 146 implements a bit flip operation in a attempt to find and/or correct an error. Block 146 may sequentially flip one bit at a time in ciphertext of the data line to generate modified ciphertext of the data line, and feed the modified ciphertext through decryption to generate modified plaintext of the data line, wherein the modified plaintext may checked for randomness/order and/or a match using the integrity value.

Block 148 determines whether block 146 has finished flipping all bits (e.g., one by one) in the data line. If so, there are no more bits to flip in the data line and illustrated processing block 150 generates an error notification. If not, modified ciphertext of the data line is sent to block 137 to be decrypted to generate modified plaintext of the data line, which is sent to block 138 to determine whether the particular bit flip operation implemented by block 146 corrected an error. In this regard, block 138 may check for a random distribution of the plurality of bits in the modified plaintext of the data line. If block 138 determines that the modified plaintext is ordered, block 140 may move the modified plaintext to cache memory and feed the modified plaintext through encryption for storage.

If block 144 determines that the plaintext is not valid, the process may be iteratively implemented until all bits have been flipped and block 138 determines that the further modified plaintext is ordered and/or block 144 determines that further modified plaintext is valid. Notably, if a plurality of modified plaintext appears valid, block 140 may move the modified plaintext with the largest amount of order (e.g., bit flip position that results in the greatest compressibility, satisfies a compressibility threshold, etc.) to cache memory and feed that modified plaintext through encryption for storage.

Figure 8:
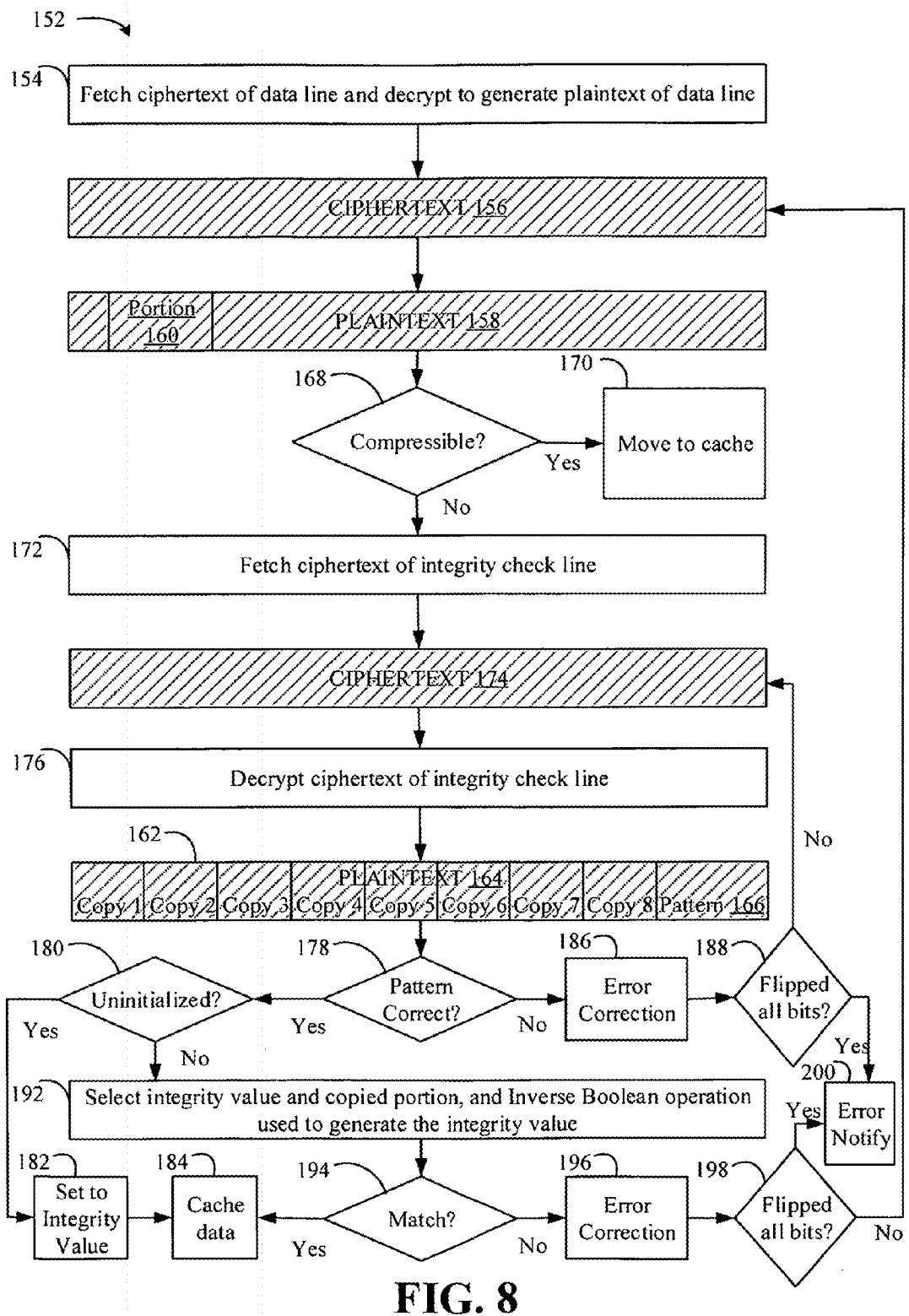
FIG. 8 is a flowchart of an example of a method to correct an error to provide memory integrity according to an embodiment.

FIG. 8 shows an example of a method 152 is to maintain integrity of memory according to an embodiment. The method 152 may be implemented, for example, as a set of logic instructions stored in a machine- or computer-readable storage medium. Illustrated block 154 reads (e.g., fetches) ciphertext 156 of a data line and decrypts the ciphertext to generate plaintext 158 of the data line. Encryption used to generate the ciphertext 156 and decryption used to generate the plaintext 158 may include, for example, Threefish, AES-XTS, AES-ECB, etc., such that a malicious n-bit change (e.g., one-bit change, two-bit change, all-bit change, etc.) to the ciphertext 156 may be determined from a relatively random and/or high entropy decrypted plaintext result in the plaintext 158. In the illustrated example, the plaintext 158 includes a portion 160 used to generate a copy 162 that is stored as an integrity value. As noted above, the integrity value may be an HMAC (e.g., SHA3 HMAC) calculated over the entire data line. Thus, plaintext of the data line was random and caused the copy 162 to be generated and stored in plaintext 164 (e.g., an integrity check line) to validate the integrity of the data line.

The copy 162 may be any size up to the width of the plaintext 164. In the illustrated example, the size of the copy 162 is less than the width of the plaintext 164, which includes eight slots with eight copies 1-8 from eight data lines that are encrypted and stored in the memory at respective physical memory locations. In addition, the copy 162 may be generated from any portion of the pre-encryption data line. For example, the copy 162 may be first n-bits of data line, middle n-bits of the data line, last n-bits of the data line, alternating n-bits of the data line, and so on.

In the illustrated example, the copy 162 is generated from a second 64-bit portion of the data line as evidenced by the position of the portion 160 of the plaintext 158. Notably, a diffusion property of a cipher converting the ciphertext 156 to the plaintext 158 will diffuse even single bit (in addition to any multi bit) changes in the ciphertext 156 across the entire data line. Thus, changes to any portion of the ciphertext 156 will also pollute the portion 160 of the plaintext 158 with high probability.

The copy 162 is stored at a predetermined location in the plaintext 164. The copy 162 may, for example, always be stored in a same slot of a same integrity check line based on a physical memory address for the data line. In the illustrated example, the copy 162 is stored in a second slot (e.g., a second 64-bit slot as copy 2) of the eight slots of the plaintext 164 (e.g., 512-bit wide integrity check line) based on the physical memory address of the data line. The copy 162 may, however, be stored at any other location of the integrity check line 164 (e.g., slot 4 as copy 4, slot 8 as copy 8, etc.), at any other integrity check line, based on any other approach (e.g., via a table), and so on, or combinations thereof. In one example, a hash table may be implemented, wherein the address may be hashed to select an index into the hash table to store the corresponding integrity value.

In addition, a recognizable non-random pattern 166 (e.g., pad bits) is added to the end of the plaintext 164 to be used in error correction. The pattern 166 may be any size and/or located at any position (e.g., split up and interspersed) in the plaintext 164. Block 168 implements a first integrity check on the plaintext 158 by determining whether the plaintext 158 includes a random distribution of a plurality of bits. For example, block 168 may utilize a compression function to determine whether the plaintext 158 is compressible (e.g., includes a sufficient number of patterns to be considered compressible, etc.). If block 168 determines that the plaintext 158 is compressible, the plaintext 158 passes the first integrity check and illustrated processing block 170 moves the plaintext 158 to cache memory.

If block 168 determines that the plaintext 158 is not compressible (or otherwise appears random), illustrated processing block 172 initiates a second integrity check on the plaintext 158 by reading (e.g., fetching) ciphertext 174 of the plaintext 164 based on the physical memory address of the data line, and illustrated processing block 176 decrypts the ciphertext 174 to generate the plaintext 164. In one example, the cipher will diffuse even single bit changes in the ciphertext 174 across the entire plaintext of the plaintext 164, corrupting the entire plaintext (including the pad).

Block 178 determines whether the pattern 166 is correct. In this regard, a malicious n-bit change to the ciphertext 174 may be diffused across the plaintext 164 to cause the pattern 164 to change. Bits of the pattern 166 may, however, be distributed across the integrity check value 164 to capture errors that affect each slot when a malicious n-bit change to the ciphertext 174 is to affect less than the entire plaintext 164 (e.g., via a fixed block size of 64 bits that affects copy 2, a 128-bit fixed block size that affects copy 1 and copy 2, etc.).

If block 178 determines that the pattern 166 is correct, block 180 determines whether the integrity value in the second slot (e.g., as determined by least significant its of the physical memory address) of the integrity check line 164 is set to "uninitialized". If so, the copy 162 is not stored in the integrity check line 164 and illustrated processing block 182 updates the second slot with the copy 162 by, for example, replacing the "uninitialized" value in the second slot (e.g., as copy 2) with the copy 162. In this case, illustrated processing block 184 moves the plaintext 158 to cache memory.

If block 178 determines that the pattern (e.g., known pattern) 166 is not correct, illustrated block 186 implements error correction on the plaintext 164. For example, block 186 may sequentially flip bits in the ciphertext 174 until the pattern 166 is restored. Block 188 determines whether all bits have been flipped. If not, the process is iteratively repeated until all bits in the ciphertext 174 have been flipped. For example, block 176 iteratively decrypts modified ciphertext, block 178 iteratively checks the pattern 178 for the modified ciphertext, and so on, until either the expected pattern 166 emerges or all bits have been tested and an error is reported by block 200.

In this regard, blocks 186, 188 are exclusively attempting to error correct an integrity check line by attempting to restore the pattern 166. If none of the bit flips attempted on the ciphertext of the integrity check line restore the pattern 166, error correction may be abandoned and an error may be reported by block 200. The process may be independent of the copy 162 which may be utilized in block 194. Also, the process may move to block 194 only if there are no errors with the plaintext 164, or the errors with the integrity check line cannot be fixed.

If block 178 determines that the pattern 166 is correct and block 180 determines that the integrity value in the second slot of the plaintext 164 is not set to "uninitialized", illustrated processing block 192 selects the copy 162 and the portion 160, and may reverse a Boolean operation used to generate the integrity value that is stored (e.g., if copy 2 stored as an XOR result). For example, an XOR result would be stored as copy 2, which would be XORed with a portion of the ciphertext 156 (same portion originally used to calculate and store the integrity value in slot 2 as copy 2). Then, the result of this XOR is compared with the value of the portion 160 to see if they are equal. In this regard, the result should be the value of copy 162, in which case block 194 determines there is a match. In another example, where SHA3 HMAC is used, a truncated SHA HMAC value may be stored as copy 2, which would be compared with the SHA HMAC of the entire plaintext 158 by block 194.

Thus, block 192 may perform a compliment operation to the pre-processing operation to generate the copy 162. The Boolean operation may be bypassed when the copy 162 is not pre-processed (e.g., XORed). Block 194 determines if there is a match between the copy 162 read from the plaintext 164 or calculated from the compliment operation and the portion 160. Alternatively, if there is no compliment operation, then block 194 may determine if the value in 160 equals the value stored as copy 2.

If block 194 determines there is a match, block 184 moves the plaintext 158 to cache memory. If block 194 determines there is a mismatch, illustrated block 196 attempts to implement error correction on the plaintext 158. For example, block 196 may sequentially flip bits in the ciphertext 156 until block 168 determines that a random distribution of a plurality of bits disappears (e.g., satisfies a threshold), a pattern appears (e.g., satisfies a threshold), modified plaintext generated from modified ciphertext (as a result of bit flipping in the ciphertext 156) is compressible (e.g., satisfies a compression threshold), and so on, or combination thereof. Notably, for each bit flipped in the ciphertext 156, block 168 may determine if a pattern emerges.

If not, block 192 and block 194 will be performed to determine if the resulting integrity check value matches instead. If either block 168 or block 194 determines an affirmative result, then error correction was achieved. Block 198 determines whether all bits in the ciphertext 156 have been flipped. If so, illustrated processing block 200 may issue an error notification. If not, the process may be iteratively repeated until all bits in the ciphertext 156 have been flipped.

For example, block 192 iteratively generates the copy 162 from modified ciphertext, block 194 iteratively determines if there is a match, and so on. In this regard, during error correction, for every bit flipped in the ciphertext 156, both the implicit integrity (randomness) and the integrity value may be rechecked. Thus, the data in the various blocks in the method 152 may be cached locally so there is no need to re-fetch, e.g., data lines from memory, re-fetch and decrypt the integrity values from memory, etc.

While independent methods, blocks, and/or a particular order has been shown for illustration purposes, it should be understood that one or more of the blocks of any of the methods 110 (FIG. 5), 124 (FIG. 6), 134 (FIG. 7), 152 (FIG. 8), discussed above, may be combined, omitted, bypassed, re-arranged, and/or flow in any order. In one example, the methods 110, 124, 134, and/or 152 may be combined to accomplish one or more functions of the apparatus 10 (FIG. 1), discussed above. In another example, block 180 and block 186 may occur in parallel, block 186 and block 196 may occur in parallel, and so on. In addition, it should be understood that any or all of the aspects of examples discussed in FIGS. 1-4 may apply to any or all of the methods 110, 124, 134, and/or 152, and vice versa. For example, encryption, decryption, keys, tweaks, etc., discussed above with regard to FIGS. 1-4 may be included in any or all of the methods 110, 124, 134, 152.

Additional Notes and Examples

Example 1 may include an apparatus to provide memory integrity comprising memory and logic, at least partially implemented in hardware, to identify unencrypted data including a plurality of bits, wherein the unencrypted data is to be encrypted and stored in the memory, determine whether the unencrypted data includes a random distribution of the plurality of bits, and implement error correction by a modification to ciphertext of the unencrypted data when the unencrypted data includes a random distribution of the plurality of bits and is corrupt.

Example 2 may include the apparatus of Example 1, further including an error corrector to flip one or more bits in ciphertext of an integrity check line to generate modified ciphertext of the integrity check line, wherein the modified ciphertext of the integrity check line is to be decrypted to generate modified plaintext of the integrity check line that is to be checked for a recognizable pattern, and replace the ciphertext of the integrity check line with the modified ciphertext of the integrity check line when the recognizable pattern is restored in the modified plaintext of the integrity check line.

Example 3 may include the apparatus of any one of Example 1 to Example 2, further including a verifier to one or more of determine whether there is a match between an integrity value of modified plaintext of the integrity check line and the unencrypted data, or determine whether there is a match between the integrity value of the modified plaintext of the integrity check line and the unencrypted data when a recognizable pattern is restored in one or more of the modified plaintext of the integrity check line and the unencrypted data.

Example 4 may include the apparatus of any one of Example 1 to Example 3, wherein the unencrypted data is to include modified plaintext of the unencrypted data.

Example 5 may include the apparatus of any one of Example 1 to Example 4, further including an error corrector to flip one or more bits in the ciphertext of the unencrypted data to generate modified ciphertext of the unencrypted data when the unencrypted data includes a random distribution of the plurality of bits and is corrupt, wherein the modified ciphertext of the unencrypted data is to be decrypted to generate modified plaintext of the unencrypted data that is to be checked for a random distribution of the plurality of bits, and replace the ciphertext of the unencrypted data with the modified ciphertext of the unencrypted data when the modified plaintext of the unencrypted data does not include a random distribution of the plurality of bits.

Example 6 may include the apparatus of any one of Example 1 to Example 5, further including a verifier to determine whether there is a match between an integrity value of an integrity check line for the unencrypted data and the modified plaintext of the of the unencrypted data.

Example 7 may include the apparatus of any one of Example 1 to Example 6, wherein the integrity check line is to include modified plaintext of the integrity check line.

Example 8 may include the apparatus of any one of Example 1 to Example 7, further including a diffuser to encrypt the unencrypted data when a block size of a block cipher is less than a granularity the memory is to be accessed, wherein the diffuser is to one or more of generate intermediate ciphertext for each data block using a number of encryption rounds that ensures diffusion across the unencrypted data of at least a one-bit change and that is less than a number that provides sufficient confidentiality, or generate intermediate ciphertext for each data block using a re-mapping of bits of each data block.

Example 9 may include the apparatus of any one of Example 1 to Example 8, further including a value selector to select one of a key from a plurality of keys of a key domain or a tweak from a plurality of tweaks of a tweak domain for a location in the memory.

Example 10 may include the apparatus of any one of Example 1 to Example 9, wherein the logic is to determine whether an integrity value is needed based on an integrity value threshold from a real data model.

Example 11 may include the apparatus of any one of Example 1 to Example 10, further including one or more of an integrity line selector to select an integrity check line to store an integrity value for the unencrypted data, or a slot selector to select a slot of the integrity check line for the integrity value, wherein the integrity check line is to include a plurality of slots for a plurality of integrity values.

Example 12 may include the apparatus of any one of Example 1 to Example 11, wherein the logic is to determine whether unencrypted data includes a random distribution of the plurality of bits based on a compression function.

Example 13 may include at least one computer readable storage medium comprising a set of instructions, which when executed by a computer, cause the computer to identify unencrypted data including a plurality of bits, wherein the unencrypted data is to be encrypted and stored in memory, determine whether the unencrypted data includes a random distribution of the plurality of bits, and implement error correction by a modification to ciphertext of the unencrypted data when the unencrypted data includes a random distribution of the plurality of bits and is corrupt.

Example 14 may include the at least one computer readable storage medium of Example 13, wherein the instructions, when executed, cause the computer to flip one or more bits in ciphertext of an integrity check line to generate modified ciphertext of the integrity check line, wherein the modified ciphertext of the integrity check line is to be decrypted to generate modified plaintext of the integrity check line that is to be checked for a recognizable pattern, and replace the ciphertext of the integrity check line with the modified ciphertext of the integrity check line when the recognizable pattern is restored in the modified plaintext of the integrity check line.

Example 15 may include the at least one computer readable storage medium of any one of Example 13 to Example 14, wherein the instructions, when executed, cause the computer to one or more of determine whether there is a match between an integrity value of modified plaintext of the integrity check line and the unencrypted data, or determine whether there is a match between the integrity value of the modified plaintext of the integrity check line and the unencrypted data when a recognizable pattern is restored in one or more of the modified plaintext of the integrity check line and the unencrypted data.

Example 16 may include the at least one computer readable storage medium of any one of Example 13 to Example 15, wherein the unencrypted data is to include modified plaintext of the unencrypted data.

Example 17 may include the at least one computer readable storage medium of any one of Example 13 to Example 16, wherein the instructions, when executed, cause the computer to flip one or more bits in the ciphertext of the unencrypted data to generate modified ciphertext of the unencrypted data when the unencrypted data includes a random distribution of the plurality of bits and is corrupt, wherein the modified ciphertext of the unencrypted data is to be decrypted to generate modified plaintext of the unencrypted data that is to be checked for a random distribution of the plurality of bits, and replace the ciphertext of the unencrypted data with the modified ciphertext of the unencrypted data when the modified plaintext of the unencrypted data does not include a random distribution of the plurality of bits.

Example 18 may include the at least one computer readable storage medium of any one of Example 13 to Example 17, wherein the instructions, when executed, cause the computer to determine whether there is a match between an integrity value of an integrity check line for the unencrypted data and the modified plaintext of the of the unencrypted data.

Example 19 may include the at least one computer readable storage medium of any one of Example 13 to Example 18, wherein the integrity check line is to include modified plaintext of the integrity check line.

Example 20 may include the at least one computer readable storage medium of any one of Example 13 to Example 19, wherein the instructions, when executed, cause the computer to encrypt the unencrypted data when a block size of a block cipher is less than a granularity the memory is to be accessed, wherein the computer is further to one or more of generate intermediate ciphertext for each data block using a number of encryption rounds that ensures diffusion across the unencrypted data of at least a one-bit change and that is less than a number that provides sufficient confidentiality, or generate intermediate ciphertext for each data block using a re-mapping of bits of each data block.

Example 21 may include the at least one computer readable storage medium of any one of Example 13 to Example 20, wherein the instructions, when executed, cause the computer to select one of a key from a plurality of keys of a key domain or a tweak from a plurality of tweaks of a tweak domain for a location in the memory.

Example 22 may include the at least one computer readable storage medium of any one of Example 13 to Example 21, wherein the instructions, when executed, cause the computer to determine whether an integrity value is needed based on an integrity value threshold from a real data model.

Example 23 may include the at least one computer readable storage medium of any one of Example 13 to Example 22, wherein the instructions, when executed, cause the computer to one or more of select an integrity check line to store an integrity value for the unencrypted data, or select a slot of the integrity check line for the integrity value, wherein the integrity check line is to include a plurality of slots for a plurality of integrity values.

Example 24 may include the at least one computer readable storage medium of any one of Example 13 to Example 23, wherein the instructions, when executed, cause the computer to determine whether unencrypted data includes a random distribution of the plurality of bits based on a compression function.

Example 25 may include a method to provide memory integrity comprising identifying unencrypted data including a plurality of bits, wherein the unencrypted data is to be encrypted and stored in memory, determining whether the unencrypted data includes a random distribution of the plurality of bits, and implementing error correction by a modification to ciphertext of the unencrypted data when the unencrypted data includes a random distribution of the plurality of bits and is corrupt.

Example 26 may include the method of Example 25, further including flipping one or more bits in ciphertext of an integrity check line to generate modified ciphertext of the integrity check line, wherein the modified ciphertext of the integrity check line is decrypted to generate modified plaintext of the integrity check line that is checked for a recognizable pattern, and replacing the ciphertext of the integrity check line with the modified ciphertext of the integrity check line when the recognizable pattern is restored in the modified plaintext of the integrity check line.

Example 27 may include the method of any one of Example 25 to Example 26, further including one or more of determining whether there is a match between an integrity value of modified plaintext of the integrity check line and the unencrypted data, or determining whether there is a match between the integrity value of the modified plaintext of the integrity check line and the unencrypted data when a recognizable pattern is restored in one or more of the modified plaintext of the integrity check line and the unencrypted data.

Example 28 may include the method of any one of Example 25 to Example 27, wherein the unencrypted data includes modified plaintext of the unencrypted data.

Example 29 may include the method of any one of Example 25 to Example 28, further including flipping one or more bits in the ciphertext of the unencrypted data to generate modified ciphertext of the unencrypted data when the unencrypted data includes a random distribution of the plurality of bits and is corrupt, wherein the modified ciphertext of the unencrypted data is decrypted to generate modified plaintext of the unencrypted data that is checked for a random distribution of the plurality of bits, and replacing the ciphertext of the unencrypted data with the modified ciphertext of the unencrypted data when the modified plaintext of the unencrypted data does not include a random distribution of the plurality of bits.

Example 30 may include the method of any one of Example 25 to Example 29, further including determining whether there is a match between an integrity value of an integrity check line for the unencrypted data and the modified plaintext of the of the unencrypted data.

Example 31 may include the method of any one of Example 25 to Example 30, wherein the integrity check line includes modified plaintext of the integrity check line.

Example 32 may include the method of any one of Example 25 to Example 31, further including encrypting the unencrypted data when a block size of a block cipher is less than a granularity the memory is to be accessed, wherein the method further includes one or more of generating intermediate ciphertext for each data block using a number of encryption rounds that ensures diffusion across the unencrypted data of at least a one-bit change and that is less than a number that provides sufficient confidentiality, or generating intermediate ciphertext for each data block using a re-mapping of bits of each data block.

Example 33 may include the method of any one of Example 25 to Example 32, further including selecting one of a key from a plurality of keys of a key domain or a tweak from a plurality of tweaks of a tweak domain for a location in the memory.

Example 34 may include the method of any one of Example 25 to Example 33, further including determining whether an integrity value is needed based on an integrity value threshold from a real data model.

Example 35 may include the method of any one of Example 25 to Example 34, further including one or more of selecting an integrity check line to store an integrity value for the unencrypted data, or selecting a slot of the integrity check line for the integrity value, wherein the integrity check line includes a plurality of slots for a plurality of integrity values.

Example 36 may include the method of any one of Example 25 to Example 35, further including determining whether unencrypted data includes a random distribution of the plurality of bits based on a compression function.

Example 37 may include an apparatus to provide memory integrity comprising means for performing the method of any one of Example 25 to Example 36.

Example 38 may include an apparatus to provide memory integrity comprising memory and a diffuser to encrypt unencrypted data when a block size of a block cipher is less than a granularity the memory is to be accessed, wherein the diffuser is to one or more of generate intermediate ciphertext for each data block using a number of encryption rounds that ensures diffusion across the unencrypted data of at least a one-bit change and that is less than a number that provides sufficient confidentiality, or generate intermediate ciphertext for each data block using a re-mapping of bits of each data block.

Example 39 may include the apparatus of Example 38, wherein the diffuser is to include an advanced encryption standard plain cipher block chaining mode (AES-PCBC) pipeline to generate the intermediate ciphertext using at least two rounds of AES for each data block, and an AES XOR encrypt XOR based tweaked codebook mode with ciphertext stealing mode (AES-XTS) pipeline to generate final ciphertext from the intermediate ciphertext using a number of encryption rounds that provides sufficient confidentiality.

Example 40 may include the apparatus of any one of Example 38 to Example 39, wherein the diffuser is to include an AES electronic code book mode (AES-ECB) pipeline to generate the intermediate ciphertext using a mixture of ciphertext data for each data block, and an AES-XTS pipeline to generate final cphertext data from the intermediate ciphertext using a number of encryption rounds that provides sufficient confidentiality.

Example 41 may include the apparatus of any one of Example 38 to Example 40, further including an inverse diffuser to decrypt final ciphertext when the block size of the block cipher is less than the granularity the memory is to be accessed to ensure diffusion across the unencrypted data of at least the one-bit change.

Example 42 may include at least one computer readable storage medium comprising a set of instructions, which when executed by a computer, cause the computer to encrypt unencrypted data when a block size of a block cipher is less than a granularity the memory is to be accessed, wherein the computer is further to generate intermediate ciphertext for each data block using a number of encryption rounds that ensures diffusion across the unencrypted data of at least a one-bit change and that is less than a number that provides sufficient confidentiality, or generate intermediate ciphertext for each data block using a re-mapping of bits of each data block.

Example 43 may include the at least one computer readable storage medium of Example 42, wherein the instructions, when executed, cause the computer to utilize an advanced encryption standard plain cipher block chaining mode (AES-PCBC) pipeline to generate the intermediate ciphertext using at least two rounds of AES for each data block, and utilize an AES XOR encrypt XOR based tweaked codebook mode with ciphertext stealing mode (AES-XTS) pipeline to generate final cphertext from the intermediate ciphertext using a number of encryption rounds that provides sufficient confidentiality.

Example 44 may include the at least one computer readable storage medium of any one of Example 42 to Example 43, wherein the instructions, when executed, cause the computer to utilize an AES electronic code book mode (AES-ECB) pipeline to generate the intermediate ciphertext using a mixture of ciphertext data for each data block, and utilize an AES-XTS pipeline to generate final cphertext data from the intermediate ciphertext using a number of encryption rounds that provides sufficient confidentiality.

Example 45 may include the at least one computer readable storage medium of any one of Example 42 to Example 44, wherein the instructions, when executed, cause the computer to decrypt final ciphertext when the block size of the block cipher is less than the granularity the memory is to be accessed to ensure diffusion across the unencrypted data of at least the one-bit change.

Example 46 may include a method to provide memory integrity comprising encrypting unencrypted data when a block size of a block cipher is less than a granularity the memory is to be accessed, wherein the method further includes one or more of generating intermediate ciphertext for each data block using a number of encryption rounds that ensures diffusion across the unencrypted data of at least a one-bit change and that is less than a number that provides sufficient confidentiality, or generating intermediate ciphertext for each data block using a re-mapping of bits of each data block.

Example 47 may include the method of Example 46, further including: utilizing an advanced encryption standard plain cipher block chaining mode (AES-PCBC) pipeline to generate the intermediate ciphertext using at least two rounds of AES for each data block, and utilizing an AES XOR encrypt XOR based tweaked codebook mode with ciphertext stealing mode (AES-XTS) pipeline to generate final cphertext from the intermediate ciphertext using a number of encryption rounds that provides sufficient confidentiality.

Example 48 may in the include the method of any one of Example 46 to Example 47, further including utilizing an AES electronic code book mode (AES-ECB) pipeline to generate the intermediate ciphertext using a mixture of ciphertext data for each data block, and utilizing an AES-XTS pipeline to generate final cphertext data from the intermediate ciphertext using a number of encryption rounds that provides sufficient confidentiality.

Example 49 may in the include the method of any one of Example 46 to Example 48, further including decrypting final ciphertext when the block size of the block cipher is less than the granularity the memory is to be accessed to ensure diffusion across the unencrypted data of at least the one-bit change.

Example 50 may include an apparatus to provide memory integrity comprising means for performing the method of any one of Example 46 to Example 49.

Example 51 may include an apparatus to provide memory integrity comprising memory and a value selector to select one of a key from a plurality of keys of a key domain or a tweak from a plurality of tweaks of a tweak domain for a physical location in the memory that is to store data.

Example 52 may include the apparatus of Example 51, further including a function detector to determine that a function is to be given access to the physical location in the memory for a first time, wherein the value selector is to select one of the key or the tweak when the function is to be given access.

Example 53 may include the apparatus of any one of Example 51 to Example 52, further including an allocator to reallocate the physical location in the memory from one function to another function, wherein the value selector is to select one of the key or the tweak when the physical location in the memory is to be reallocated.

Example 54 may include the apparatus of any one of Example 51 to Example 53, further including a refresher to refresh the physical location in memory, wherein the value selector is to select one of the key or the tweak when the physical location in the memory is to be refreshed.

Example 55 may include the apparatus of any one of Example 51 to Example 54, further including a tweak function to use the physical location in the memory as input to a block cipher to bind the unencrypted data with the physical location in the memory.

Example 56 may include the apparatus of any one of Example 51 to Example 55, further including a function classifier to determine a classification based on one or more of a function type, a function privilege, or a function section, wherein the key verifier is to select one of the key or the tweak based on the classification.

Example 57 may include the apparatus of any one of Example 51 to Example 56, wherein the value selector is to identify one or more unused address bits of a physical memory address for unencrypted data, and select the one or more unused address bits to derive one of the key or the tweak.

Example 58 may include the apparatus of any one of Example 51 to Example 57, wherein the value selector is to one or more of encrypt the one or more unused address bits with a master key to derive the key, set the one or more unused address bits to derive the tweak, or obtain one of the key from an array of keys or the tweak from an array or tweaks in a secure hardware region based on the one or more unused address bits.

Example 59 may include the apparatus of any one of Example 51 to Example 58, wherein the value selector is to include a software value selector to select one of the key or the tweak from one or more unused most significant address bits of a physical memory address for the unencrypted data.

Example 60 may include the apparatus of any one of Example 51 to Example 59, further including logic, at least partially implemented in hardware, to issue a notification to one or more of a user or a function of one or more of a use-after-free attack, a replay attack, or a buffer overflow/underflow attack.

Example 61 may include at least one computer readable storage medium comprising a set of instructions, which when executed by a computer, cause the computer to select one of a key from a plurality of keys of a key domain or a tweak from a plurality of tweaks of a tweak domain for a physical location in memory that is to store data.

Example 62 may include the at least one computer readable storage medium of Example 61, wherein the instructions, when executed, cause the computer to determine that a function is to be given access to the physical location in the memory for a first time, and select one of the key or the tweak when the function is to be given access.

Example 63 may include the at least one computer readable storage medium of any one of Example 61 to Example 62, wherein the instructions, when executed, cause the computer to reallocate the physical location in the memory from one function to another function, and select one of the key or the tweak when the physical location in the memory is to be reallocated.

Example 64 may include the at least one computer readable storage medium of any one of Example 61 to Example 63, wherein the instructions, when executed, cause the computer to refresh the physical location in memory, and select one of the key or the tweak when the physical location in the memory is to be refreshed.

Example 65 may include the at least one computer readable storage medium of any one of Example 61 to Example 64, wherein the instructions, when executed, cause the computer to utilize the physical location in the memory as input to a block cipher to bind the unencrypted data with the physical location in the memory.

Example 66 may include the at least one computer readable storage medium of any one of Example 61 to Example 65, wherein the instructions, when executed, cause the computer to determine a classification based on one or more of a function type, a function privilege, or a function section, and select one of the key or the tweak based on the classification.

Example 67 may include the at least one computer readable storage medium of any one of Example 61 to Example 66, wherein the instructions, when executed, cause the computer to identify one or more unused address bits of a physical memory address for unencrypted data, and select the one or more unused address bits to derive one of the key or the tweak.

Example 68 may include the at least one computer readable storage medium of any one of Example 61 to Example 67, wherein the instructions, when executed, cause the computer to one or more of encrypt the one or more unused address bits with a master key to derive the key, set the one or more unused address bits to derive the tweak, or obtain one of the key from an array of keys or the tweak from an array or tweaks in a secure hardware region based on the one or more unused address bits.

Example 69 may include the at least one computer readable storage medium of any one of Example 61 to Example 68, wherein the instructions, when executed, cause the computer to select one of the key or the tweak from one or more unused most significant address bits of a physical memory address for the unencrypted data.

Example 70 may include the at least one computer readable storage medium of any one of Example 61 to Example 69, wherein the instructions, when executed, cause the computer to issue a notification to one or more of a user or a function of one or more of a use-after-free attack, a replay attack, or a buffer overflow/underflow attack.

Example 71 may include a method to provide memory integrity comprising selecting one of a key from a plurality of keys of a key domain or a tweak from a plurality of tweaks of a tweak domain for a physical location in memory that stores data.

Example 72 may include the method of Example 71, further including determining that a function is given access to the physical location in the memory for a first time, and selecting one of the key or the tweak when the function is given access.

Example 73 may include the method of any one of Example 71 to Example 72, further including reallocating the physical location in the memory from one function to another function, and selecting one of the key or the tweak when the physical location in the memory is reallocated.

Example 74 may include the method of any one of Example 71 to Example 73, further including refreshing the physical location in memory, and selecting one of the key or the tweak when the physical location in the memory is refreshed.

Example 75 may include the method of any one of Example 71 to Example 74, further including utilizing the physical location in the memory as input to a block cipher to bind the unencrypted data with the physical location in the memory.

Example 76 may include the method of any one of Example 71 to Example 75, further including determining a classification based on one or more of a function type, a function privilege, or a function section, and selecting one of the key or the tweak based on the classification.

Example 77 may include the method of any one of Example 71 to Example 76, further including identifying one or more unused address bits of a physical memory address for unencrypted data, and selecting the one or more unused address bits to derive one of the key or the tweak.

Example 78 may include the method of any one of Example 71 to Example 77, further including one or more of encrypting the one or more unused address bits with a master key to derive the key, setting the one or more unused address bits to derive the tweak, or obtaining one of the key from an array of keys or the tweak from an array or tweaks in a secure hardware region based on the one or more unused address bits.

Example 79 may include the method of any one of Example 71 to Example 78, further including selecting one of the key or the tweak from one or more unused most significant address bits of a physical memory address for the unencrypted data.

Example 80 may include the method of any one of Example 71 to Example 79, further including issuing a notification to one or more of a user or a function of one or more of a use-after-free attack, a replay attack, or a buffer overflow/underflow attack.

Example 81 may include an apparatus to provide memory integrity comprising means for performing the method of any one of Example 71 to Example 80.

Example 82 may include an apparatus to provide memory integrity comprising an integrity line selector to select an integrity check line to store an integrity value for unencrypted data, and a slot selector to select a slot of the integrity check line for the integrity value.

Example 83 may include the apparatus of Example 82, further including logic, at least partially implemented in hardware, to determine whether an integrity value is needed based on an integrity value threshold from a real data model.

Example 84 may include the apparatus of any one of Example 82 to Example 83, wherein the logic is to determine the integrity value threshold based on a repetition of a data unit within a range of values for the data unit.

Example 85 may include the apparatus of any one of Example 82 to Example 84, wherein the integrity check line is to include a plurality of slots for a plurality of integrity values.

Example 86 may include the apparatus of any one of Example 82 to Example 85, wherein the integrity line selector and the slot selector are each to identify one or more address bits of a physical memory address for the unencrypted data and select the integrity check line and the slot based on the one or more address bits.

Example 87 may include the apparatus of any one of Example 82 to Example 86, wherein the integrity line selector is to select the integrity check line based on one or more intermediate address bits of the physical memory address, and wherein the slot selector is to select the slot based on one or more least significant address bits of the physical memory address.

Example 88 may include the apparatus of any one of Example 82 to Example 87, further including an encryptor to encrypt the integrity check line using a fixed block size, and a decryptor to decrypt the integrity check line using the fixed block size, wherein the encryptor and the decryptor are to utilize the fixed block size to limit a random distribution of a plurality of bits caused by an error to the fixed block size for the integrity value.

Example 89 may include the apparatus of any one of Example 82 to Example 88, further including an initializer to set a value of the integrity check line to an uninitialized value that is to be changed to the integrity value when memory is to be accessed by a function for the first time.

Example 90 may include the apparatus of any one of Example 82 to Example 89, further including a pattern adder to add a recognizable pattern to the integrity check line to minimize a random distribution of a plurality of bits in the integrity check line.

Example 91 may include the apparatus of any one of Example 82 to Example 90, further including an integrity value generator to generate a copy of a portion of the unencrypted data to be stored in the integrity check line as the integrity value based on a determination that the unencrypted data includes a random distribution of a plurality of bits.

Example 92 may include the apparatus of any one of Example 82 to Example 91, further including an operator to XOR bits of the copy with bits from a location of ciphertext of the unencrypted data to generate an XOR result as the integrity value, and inverse the XOR of a fetched integrity value for the unencrypted data with bits from a same location of fetched ciphertext for the unencrypted data as the location used to generate the XOR result.

Example 93 may include at least one computer readable storage medium comprising a set of instructions, which when executed by a computer, cause the computer to select an integrity check line to store an integrity value for unencrypted data, and select a slot of the integrity check line for the integrity value.

Example 94 may include the at least one computer readable storage medium of Example 93, wherein the instructions, when executed, cause the computer to determine whether an integrity value is needed based on an integrity value threshold from a real data model.

Example 95 may include the at least one computer readable storage medium of any one of Example 93 to Example 94, wherein the instructions, when executed, cause the computer to determine the integrity value threshold based on a repetition of a data unit within a range of values for the data unit.

Example 96 may include the at least one computer readable storage medium of any one of Example 93 to Example 95, wherein the integrity check line is to include a plurality of slots for a plurality of integrity values.

Example 97 may include the at least one computer readable storage medium of any one of Example 93 to Example 96, wherein the instructions, when executed, cause the computer to identify one or more address bits of a physical memory address for the unencrypted data, and select the integrity check line and the slot based on the one or more address bits.

Example 98 may include the at least one computer readable storage medium of any one of Example 93 to Example 97, wherein the instructions, when executed, cause the computer to select the integrity check line based on one or more intermediate address bits of the physical memory address, and select the slot based on one or more least significant address bits of the physical memory address.

Example 99 may include the at least one computer readable storage medium of any one of Example 93 to Example 98, wherein the instructions, when executed, cause the computer to encrypt the integrity check line using a fixed block size, and decrypt the integrity check line using the fixed block size, wherein the computer is to utilize the fixed block size to limit a random distribution of a plurality of bits caused by an error to the fixed block size for the integrity value.

Example 100 may include the at least one computer readable storage medium of any one of Example 93 to Example 99, wherein the instructions, when executed, cause the computer to set a value of the integrity check line to an uninitialized value that is to be changed to the integrity value when memory is to be accessed by a function for the first time.

Example 101 may include the at least one computer readable storage medium of any one of Example 93 to Example 100, wherein the instructions, when executed, cause the computer to add a recognizable pattern to the integrity check line to minimize a random distribution of a plurality of bits in the integrity check line.

Example 102 may include the at least one computer readable storage medium of any one of Example 93 to Example 101, wherein the instructions, when executed, cause the computer to generate a copy of a portion of the unencrypted data to be stored in the integrity check line as the integrity value based on a determination that the unencrypted data includes a random distribution of a plurality of bits.

Example 103 may include the at least one computer readable storage medium of any one of Example 93 to Example 102, wherein the instructions, when executed, cause the computer to XOR bits of the copy with bits from a location of ciphertext of the unencrypted data to generate an XOR result as the integrity value, and inverse the XOR of a fetched integrity value for the unencrypted data with bits from a same location of fetched ciphertext for the unencrypted data as the location used to generate the XOR result.

Example 104 may include a method to provide memory integrity comprising selecting an integrity check line to store an integrity value for unencrypted data, and selecting a slot of the integrity check line for the integrity value.

Example 105 may include the method of Example 104, further including determining whether an integrity value is needed based on an integrity value threshold from a real data model.

Example 106 may in the include the method of any one of Example 104 to Example 105, further including determining the integrity value threshold based on a repetition of a data unit within a range of values for the data unit.

Example 107 may in the include the method of any one of Example 104 to Example 106, wherein the integrity check line includes a plurality of slots for a plurality of integrity values.

Example 108 may in the include the method of any one of Example 104 to Example 107, further including identifying one or more address bits of a physical memory address for the unencrypted data, and selecting the integrity check line and the slot based on the one or more address bits.

Example 109 may in the include the method of any one of Example 104 to Example 108, further including selecting the integrity check line based on one or more intermediate address bits of the physical memory address, and selecting the slot based on one or more least significant address bits of the physical memory address.

Example 110 may in the include the method of any one of Example 104 to Example 109, further including encrypting the integrity check line using a fixed block size, and decrypting the integrity check line using the fixed block size, wherein the computer is to utilize the fixed block size to limit a random distribution of a plurality of bits caused by an error to the fixed block size for the integrity value.

Example 111 may in the include the method of any one of Example 104 to Example 110, further including setting a value of the integrity check line to an uninitialized value that is changed to the integrity value when memory is accessed by a function for the first time.

Example 112 may in the include the method of any one of Example 104 to Example 111, further including adding a recognizable pattern to the integrity check line to minimize a random distribution of a plurality of bits in the integrity check line.

Example 113 may in the include the method of any one of Example 104 to Example 112, further including generating a copy of a portion of the unencrypted data to be stored in the integrity check line as the integrity value based on a determination that the unencrypted data includes a random distribution of a plurality of bits.

Example 114 may in the include the method of any one of Example 104 to Example 113, further including XORing bits of the copy with bits from a location of ciphertext of the unencrypted data to generate an XOR result as the integrity value, and inversing the XOR of a fetched integrity value for the unencrypted data with bits from a same location of fetched ciphertext for the unencrypted data as the location used to generate the XOR result.

Example 115 may include an apparatus to provide memory integrity comprising means for performing the method of any one of Example 104 to Example 114.

Example 116 may include an apparatus to provide memory integrity comprising logic, at least partially implemented in hardware, to determine whether unencrypted data includes a random distribution of a plurality of bits based on a compression function.

Example 117 may include the apparatus of Example 116, wherein the logic is to utilize a compressibility threshold to determine whether the unencrypted data includes a sufficient number of patterns to be determined compressible.

Example 118 may include the apparatus of any one of Example 116 to Example 117, wherein the logic is to indicate that an integrity value is needed for the unencrypted data when the unencrypted data includes an insufficient number of patterns to be determined compressible.

Example 119 may include the apparatus of any one of Example 116 to Example 118, wherein the logic is to determine that the unencrypted data is corrupt when the unencrypted data includes an insufficient number of patterns to be determined compressible, and determine that the unencrypted data is not corrupt when the unencrypted data includes a sufficient number of patterns to be determined compressible.

Example 120 may include at least one computer readable storage medium comprising a set of instructions, which when executed by a computer, cause the computer to determine whether unencrypted data includes a random distribution of a plurality of bits based on a compression function.

Example 121 may include the at least one computer readable storage medium of Example 120, wherein the instructions, when executed, cause the computer to utilize a compressibility threshold to determine whether the unencrypted data includes a sufficient number of patterns to be determined compressible.

Example 122 may include the at least one computer readable storage medium of any one of Example 120 to Example 121, wherein the instructions, when executed, cause the computer to indicate that an integrity value is needed for the unencrypted data when the unencrypted data includes an insufficient number of patterns to be determined compressible.

Example 123 may include the at least one computer readable storage medium of any one of Example 120 to Example 122, wherein the instructions, when executed, cause the computer to determine that the unencrypted data is corrupt when the unencrypted data includes an insufficient number of patterns to be determined compressible, and determine that the unencrypted data is not corrupt when the unencrypted data includes a sufficient number of patterns to be determined compressible.

Example 124 may include a method to provide memory integrity comprising determining whether unencrypted data includes a random distribution of a plurality of bits based on a compression function.

Example 125 may include the method of Example 124, further including utilizing a compressibility threshold to determine whether the unencrypted data includes a sufficient number of patterns to be determined compressible.

Example 126 may in the include the method of any one of Example 124 to Example 125, further including indicating that an integrity value is needed for the unencrypted data when the unencrypted data includes an insufficient number of patterns to be determined compressible.

Example 127 may in the include the method of any one of Example 124 to Example 126, further including determining that the unencrypted data is corrupt when the unencrypted data includes an insufficient number of patterns to be determined compressible, and determining that the unencrypted data is not corrupt when the unencrypted data includes a sufficient number of patterns to be determined compressible.

Example 128 may include an apparatus to provide memory integrity comprising means for performing the method of any one of Example 124 to Example 127.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so forth", "and so on", or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   memory, and
   logic, at least partially implemented in hardware, to,
      identify unencrypted data including a plurality of bits, wherein the unencrypted data is to be encrypted and stored in the memory,
      determine whether the unencrypted data includes a random distribution of the plurality of bits, and
      implement error correction by a modification to ciphertext of the unencrypted data to reduce randomness when the unencrypted data includes a random distribution of the plurality of bits and is corrupt, wherein the logic is further to,
         flip one or more bits in ciphertext of an integrity check line to generate modified ciphertext of the integrity check line,
         decrypt the modified ciphertext of the integrity check line to generate modified plaintext of the integrity check line,
         check the modified plaintext of the integrity check line for a recognizable pattern including to determine one or more of whether there is a match between an integrity value of the modified plaintext of the integrity check line and the unencrypted data or whether there is a match between the integrity value of the modified plaintext of the integrity check line and the unencrypted data when the recognizable pattern is restored in one or more of the modified plaintext of the integrity check line or the unencrypted data, and
         replace the ciphertext of the integrity check line with the modified ciphertext of the integrity check line when the recognizable pattern is restored in the modified plaintext of the integrity check line.

2. The apparatus of claim 1, wherein the unencrypted data is to include modified plaintext of the unencrypted data.

3. The apparatus of claim 1, further including to,
   flip one or more bits in the ciphertext of the unencrypted data to generate modified ciphertext of the unencrypted data when the unencrypted data includes a random distribution of the plurality of bits and is corrupt,
   decrypt the modified ciphertext of the unencrypted data to generate modified plaintext of the unencrypted data,
   check the modified ciphertext of the unencrypted data for a random distribution of the plurality of bits, and
   replace the ciphertext of the unencrypted data with the modified ciphertext of the unencrypted data when the modified plaintext of the unencrypted data does not include a random distribution of the plurality of bits.

4. The apparatus of claim 3, further including to determine whether there is a match between the integrity value and the modified plaintext of the of the unencrypted data.

5. The apparatus of claim 1, further including to encrypt the unencrypted data when a block size of a block cipher is less than a granularity the memory is to be accessed including to one or more of,
   generate intermediate ciphertext for each data block using a number of encryption rounds that ensures diffusion across the unencrypted data of at least a one-bit change and that is less than a number that provides sufficient confidentiality, or
   generate intermediate ciphertext for each data block using a re-mapping of bits of each data block.

6. The apparatus of claim 1, further including to one or more of:
   select one of a key from a plurality of keys of a key domain; or
   select a tweak from a plurality of tweaks of a tweak domain.

7. The apparatus of claim 1, further including to determine whether the integrity value is needed based on an integrity value threshold from a real data model.

8. The apparatus of claim 1, further including to one or more of,
   select a particular integrity check line to store a particular integrity value for the unencrypted data, or
   select a slot of the integrity check line for the integrity value, wherein the integrity check line is to include a plurality of slots for a plurality of integrity values.

9. The apparatus of claim 1, further including to determine whether unencrypted data includes a random distribution of the plurality of bits based on a compression function.

10. At least one non-transitory computer readable storage medium comprising a set of instructions, which when executed by a computer, cause the computer to:
    identify unencrypted data including a plurality of bits, wherein the unencrypted data is to be encrypted and stored in memory;
    determine whether the unencrypted data includes a random distribution of the plurality of bits; and
    implement error correction by a modification to ciphertext of the unencrypted data to reduce randomness when the unencrypted data includes a random distribution of the plurality of bits and is corrupt, wherein the computer is further to:
    flip one or more bits in ciphertext of an integrity check line to generate modified ciphertext of the integrity check line;
    decrypt the modified ciphertext of the integrity check line to generate modified plaintext of the integrity check line;
    check the modified plaintext of the integrity check line for a recognizable pattern including to determine one or more of whether there is a match between an integrity value of the modified plaintext of the integrity check line and the unencrypted data or whether there is a match between the integrity value of the modified plaintext of the integrity check line and the unencrypted data when the recognizable pattern is restored in one or more of the modified plaintext of the integrity check line or the unencrypted data, and
    replace the ciphertext of the integrity check line with the modified ciphertext of the integrity check line when the recognizable pattern is restored in the modified plaintext of the integrity check line.

11. The at least one computer readable storage medium of claim 10, wherein the instructions, when executed, cause the computer to:
    flip one or more bits in the ciphertext of the unencrypted data to generate modified ciphertext of the unencrypted data when the unencrypted data includes a random distribution of the plurality of bits and is corrupt;
    decrypt the modified ciphertext of the unencrypted data to generate modified plaintext of the unencrypted data;
    check the modified ciphertext of the unencrypted data for a random distribution of the plurality of bits; and
    replace the ciphertext of the unencrypted data with the modified ciphertext of the unencrypted data when the modified plaintext of the unencrypted data does not include a random distribution of the plurality of bits.

12. The at least one computer readable storage medium of claim 11, wherein the instructions, when executed, cause the computer to determine whether there is a match between the integrity value and the modified plaintext of the of the unencrypted data.

13. The at least one computer readable storage medium of claim 10, wherein the instructions, when executed, cause the computer to encrypt the unencrypted data when a block size of a block cipher is less than a granularity the memory is to be accessed, wherein the computer is further to one or more of:
    generate intermediate ciphertext for each data block using a number of encryption rounds that ensures diffusion across the unencrypted data of at least a one-bit change and that is less than a number that provides sufficient confidentiality; or
    generate intermediate ciphertext for each data block using a re-mapping of bits of each data block.

14. The at least one computer readable storage medium of claim 10, wherein the instructions, when executed, cause the computer to one or more of:
    select a key from a plurality of keys of a key domain; or
    select a tweak from a plurality of tweaks of a tweak domain.

15. The at least one computer readable storage medium of claim 10, wherein the instructions, when executed, cause the computer to one or more of:
    select a particular integrity check line to store a particular integrity value for the unencrypted data; or
    select a slot of the integrity check line for the integrity value, wherein the integrity check line is to include a plurality of slots for a plurality of integrity values.

16. The at least one computer readable storage medium of claim 10, wherein the instructions, when executed, cause the computer to determine whether unencrypted data includes a random distribution of the plurality of bits based on a compression function.

17. A method comprising:
    identifying unencrypted data including a plurality of bits, wherein the unencrypted data is to be encrypted and stored in memory;
    determining whether the unencrypted data includes a random distribution of the plurality of bits; and
    implementing error correction by a modification to ciphertext of the unencrypted data to reduce randomness when the unencrypted data includes a random distribution of the plurality of bits and is corrupt, wherein the method further includes:

flipping one or more bits in ciphertext of an integrity check line to generate modified ciphertext of the integrity check line;

decrypting the modified ciphertext of the integrity check line to generate modified plaintext of the integrity check line;

checking the modified plaintext of the integrity check line for a recognizable pattern including determining one or more of whether there is a match between an integrity value of the modified plaintext of the integrity check line and the unencrypted data or whether there is a match between the integrity value of the modified plaintext of the integrity check line and the unencrypted data when the recognizable pattern is restored in one or more of the modified plaintext of the integrity check line or the unencrypted data; and replacing the ciphertext of the integrity check line with the modified ciphertext of the integrity check line when the recognizable pattern is restored in the modified plaintext of the integrity check line.

18. The method of claim 17, further including:

flipping one or more bits in the ciphertext of the unencrypted data to generate modified ciphertext of the unencrypted data when the unencrypted data includes a random distribution of the plurality of bits and is corrupt;

decrypting the modified ciphertext of the unencrypted data is decrypted to generate modified plaintext of the unencrypted data;

checking the modified ciphertext of the unencrypted data for a random distribution of the plurality of bits; and replacing the ciphertext of the unencrypted data with the modified ciphertext of the unencrypted data when the modified plaintext of the unencrypted data does not include a random distribution of the plurality of bits.

19. The method of claim 18, further including determining whether there is a match between the integrity value and the modified plaintext of the of the unencrypted data.

* * * * *